US010282151B2

(12) United States Patent
Suzuki

(10) Patent No.: US 10,282,151 B2
(45) Date of Patent: May 7, 2019

(54) INFORMATION PROCESSING APPARATUS, INFORMATION PROCESSING SYSTEM, AND CONTROL METHOD

(71) Applicant: Shohta Suzuki, Kanagawa (JP)

(72) Inventor: Shohta Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 40 days.

(21) Appl. No.: 15/439,215

(22) Filed: Feb. 22, 2017

(65) Prior Publication Data

US 2017/0255428 A1    Sep. 7, 2017

(30) Foreign Application Priority Data

Mar. 1, 2016   (JP) ................. 2016-039361

(51) Int. Cl.
    *G06F 3/12*    (2006.01)
    *H04N 1/00*    (2006.01)
(52) U.S. Cl.
    CPC .......... *G06F 3/1256* (2013.01); *G06F 3/1208* (2013.01); *G06F 3/1213* (2013.01);
    (Continued)
(58) Field of Classification Search
    CPC .... G06F 3/1208; G06F 3/1256; G06F 3/1288; G06F 3/1205; G06F 3/1285; G06F 3/1212; G06F 3/1215; H04N 1/00222; H04N 1/0023; H04N 1/00233; H04N 1/00244; H04N 1/0044; H04N 1/00458; H04N 1/4413
    (Continued)

(56) References Cited

U.S. PATENT DOCUMENTS

| 8,826,126 B1* | 9/2014 | Toscano ................ G06F 17/212 358/1.15 |
| 2003/0103221 A1* | 6/2003 | Natori .................. G06F 3/1205 358/1.9 |

(Continued)

FOREIGN PATENT DOCUMENTS

| JP | 2012-045816 | 3/2012 |
| JP | 2012-245695 | 12/2012 |

(Continued)

OTHER PUBLICATIONS

Extended European Search Report for 17157745.5 dated Jul. 28, 2017.

*Primary Examiner* — Chad Dickerson
(74) *Attorney, Agent, or Firm* — IPUSA, PLLC

(57) ABSTRACT

An information processing apparatus includes a memory and a processor coupled to the memory. The processor is configured to receive first print data from a client apparatus, generate at least one first preview image from the first print data for a predetermined period from a start of generation of the at least one first preview image of an initial page of the first print data, transmit the generated at least one first preview image to an image forming apparatus, and generate second print data for generating at least one second preview image that is not generated from the first print data during the predetermined period. The second print data are the first print data from which a page of which the at least one first preview image is generated during the predetermined period is excluded.

16 Claims, 19 Drawing Sheets

(52) U.S. Cl.
CPC .......... *G06F 3/1218* (2013.01); *G06F 3/1267* (2013.01); *G06F 3/1288* (2013.01); *H04N 1/00458* (2013.01); *G06F 3/1238* (2013.01)

(58) Field of Classification Search
USPC ......... 358/1.1, 1.9, 2.1, 1.11–1.18, 400–404; 715/274; 709/201–203, 211–213
See application file for complete search history.

(56) References Cited

U.S. PATENT DOCUMENTS

| | | | |
|---|---|---|---|
| 2006/0028678 A1* | 2/2006 | Negishi | H04N 1/00347 358/1.15 |
| 2009/0100462 A1* | 4/2009 | Park | G06F 17/30849 725/38 |
| 2011/0179354 A1* | 7/2011 | Park | G06F 3/1208 715/274 |
| 2015/0169265 A1* | 6/2015 | Sanuki | G06F 3/1212 358/1.15 |
| 2016/0224282 A1 | 8/2016 | Suzuki | |
| 2017/0013139 A1 | 1/2017 | Suzuki | |

FOREIGN PATENT DOCUMENTS

| | | |
|---|---|---|
| JP | 2016-177705 | 10/2016 |
| JP | 2017-016653 | 1/2017 |

\* cited by examiner

FIG.3

| JOB ID | JOB NAME | USER ID | JOB INPUT DATE AND TIME | NUMBER OF COPIES | NUMBER OF PAGES | DUPLEX INFORMATION | COLOR INFORMATION | PRINT DATA RETAINING DESTINATION | PREVIEW IMAGE RETAINING DESTINATION | PRESENCE OR ABSENCE OF PREVIEW IMAGE | PREVIEW IMAGE GENERATION STATE | ... |
|---|---|---|---|---|---|---|---|---|---|---|---|---|
| 0001 | doc001 | user1 | 2011/04/26 14:13:54 | 1 | 18 | SIMPLEX | COLOR | <path>/0001 | <path>/0001 | ON | BEFORE GENERATION | ... |
| 0002 | doc002 | user1 | 2011/04/26 14:52:11 | 5 | 2 | DUPLEX | BLACK & WHITE | <path>/0002 | <path>/0002 | OFF | - | ... |
| 0003 | test1 | user2 | 2011/04/26 16:23:06 | 2 | 9 | DUPLEX | COLOR | <path>/0003 | <path>/0003 | ON | GENERATION COMPLETED | ... |
| 0004 | text1 | user3 | 2011/04/26 17:30:31 | 16 | 2 | SIMPLEX | BICOLOR | <path>/0004 | <path>/0004 | ON | BEING GENERATED | ... |
| 0005 | doc003 | user1 | 2011/04/27 09:29:58 | 23 | 1 | SIMPLEX | UNICOLOR | <path>/0005 | <path>/0005 | OFF | - | ... |
| 0006 | test2 | user2 | 2011/04/27 11:22:25 | 8 | 3 | SIMPLEX | BLACK & WHITE | <path>/0006 | <path>/0006 | ON | GENERATION COMPLETED | ... |
| ... | ... | ... | ... | ... | ... | ... | ... | ... | ... | ... | ... | ... |

FIG.4

| SETTING ITEM | SETTING VALUE | NOTE |
|---|---|---|
| (a) PREVIEW IMAGE GENERATION | ☐ YES<br>☐ NO | SETTING AS TO WHETHER TO GENERATE PREVIEW IMAGE |
| (b) PREVIEW IMAGE PREPARATION | ☐ YES<br>☐ NO | SETTING AS TO WHETHER TO GENERATE PREVIEW IMAGE IN RESPONSE TO RECEPTION OF JOB |
| (c) MAXIMUM NUMBER OF PROCESSES OF PREVIEW IMAGE GENERATION | 1-3 | NUMBER OF ACTIVATABLE PROCESSES OF PREVIEW IMAGE GENERATION |
| (d) SECOND PRINT LANGUAGE PREVIEW IMAGES | ☐ ALL<br>☐ SOME | EITHER IS SELECTED IN CASE OF USING SECOND PRINT LANGUAGE |
| (e) AMOUNT OF GENERATION OF SECOND PRINT LANGUAGE PREVIEW IMAGES | ☐ LARGE<br>☐ NORMAL<br>☐ SMALL | SET WHEN "SOME" IS SELECTED FOR (d) |

FIG.7A

ON-DEMAND PRINTING

PLEASE SELECT DOCUMENT, AND PRESS "PRINT" OR "DELETE" BUTTON

| | | | CLOSE |
|---|---|---|---|

UPDATE DISPLAY

| REVERSE CHRONOLOGICAL ORDER | CHRONOLOGICAL ORDER |
|---|---|

USER NAME:
user1
NUMBER OF DOCUMENTS: 15 doc001.doc  PRINTED
2011/04/26 14:13:54  2 PAGES  7 COPIES  DUPLEX  BLACK & WHITE  2in1 doc002.doc
2011/04/26 14:13:35  2 PAGES  1 COPY  SIMPLEX  COLOR  4in1 doc003.doc
2011/04/26 14:13:13  1 PAGE  1 COPY  DUPLEX  BLACK & WHITE  9in1 doc004.doc  PRINTED
2011/04/26 14:12:55  1 PAGE  1 COPY  SIMPLEX  COLOR  9in1 doc005.doc
2011/04/26 14:12:30  1 PAGE  12 COPIES  DUPLEX  BLACK & WHITE  16in1

| PREVIOUS | 2/3 | NEXT |
|---|---|---|

DELETE

PREVIEW — 701

PRINT

FIG.15

| PRINT JOB ID | USER ID | PRINT DATA PATH | PREVIEW IMAGE DATA PATH |
|---|---|---|---|
| 1 | USER #A | AAA.BBB. | XXX.YYY. |
| 2 | USER #B | CCC.DDD. | YYY.ZZZ. |
| 3 | USER #A | EEE.FFF. | WWW.XXX. |
| 4 | USER #A | GGG.HHH. | WWW.VVV. |

INFORMATION PROCESSING APPARATUS, INFORMATION PROCESSING SYSTEM, AND CONTROL METHOD

CROSS-REFERENCE TO RELATED APPLICATION

The present application claims priority under 35 U.S.C. § 119 to Japanese Patent Application No. 2016-039361, filed on Mar. 1, 2016, the entire contents of which are incorporated herein by reference in their entirety.

BACKGROUND OF THE INVENTION

1. Field of the Invention

The present disclosure relates to information processing apparatuses, information processing systems, and control methods.

2. Description of the Related Art

A printing feature referred to as "pull printing" is known. According to pull printing, the print data of a user are stored in a server, and the print data are printed at the user's request.

To be more specific, according to pull printing, print jobs including print data are input to a server from a client, and thereafter, a user of the client specifies a print job to be executed in a print job list displayed on an image forming apparatus. The image forming apparatus obtains the specified print job from the server and executes the obtained print job to perform printing.

Furthermore, as a function of pull printing, causing a preview image to be displayed on the operation panel of the image forming apparatus before actual printing in order to avoid unnecessary printing to contribute to reduction in total cost of ownership (TCO) is known. (See, for example, Japanese Unexamined Patent Application Publication No. 2012-245695.)

SUMMARY OF THE INVENTION

According to an aspect of the present invention, an information processing apparatus includes a memory and a processor coupled to the memory. The processor is configured to receive first print data from a client apparatus, generate at least one first preview image from the first print data for a predetermined period from a start of generation of the at least one first preview image of an initial page of the first print data, transmit the generated at least one first preview image to an image forming apparatus, and generate second print data for generating at least one second preview image that is not generated from the first print data during the predetermined period. The second print data are the first print data from which a page of which the at least one first preview image is generated during the predetermined period is excluded.

BRIEF DESCRIPTION OF THE DRAWINGS

FIG. 3 is a diagram depicting a job table according to the first embodiment;

FIG. 4 is a diagram illustrating setting items of a server according to the first embodiment;

FIGS. 7A and 7B are diagrams depicting display examples of the operation panel of the image forming apparatus according to the first embodiment;

FIG. 15 a diagram depicting information stored in a storage part according to the second embodiment;

DESCRIPTION OF THE EMBODIMENTS

According to pull printing, in the case of generating preview images in the server, the efficiency of the server is taken into consideration. For example, generating all the preview images of a large amount of print data at the same time significantly increases an operational load on the server and the time required for processing, and may cause a delay in other processes. Furthermore, a large amount of preview image data by itself reduces a memory area.

An embodiment of the present invention has an object of efficiently generating preview images.

According to an embodiment of the present invention, it is possible to efficiently generate preview images.

Embodiments of the present invention are described with reference to the accompanying drawings.

First Embodiment

Figure 1:
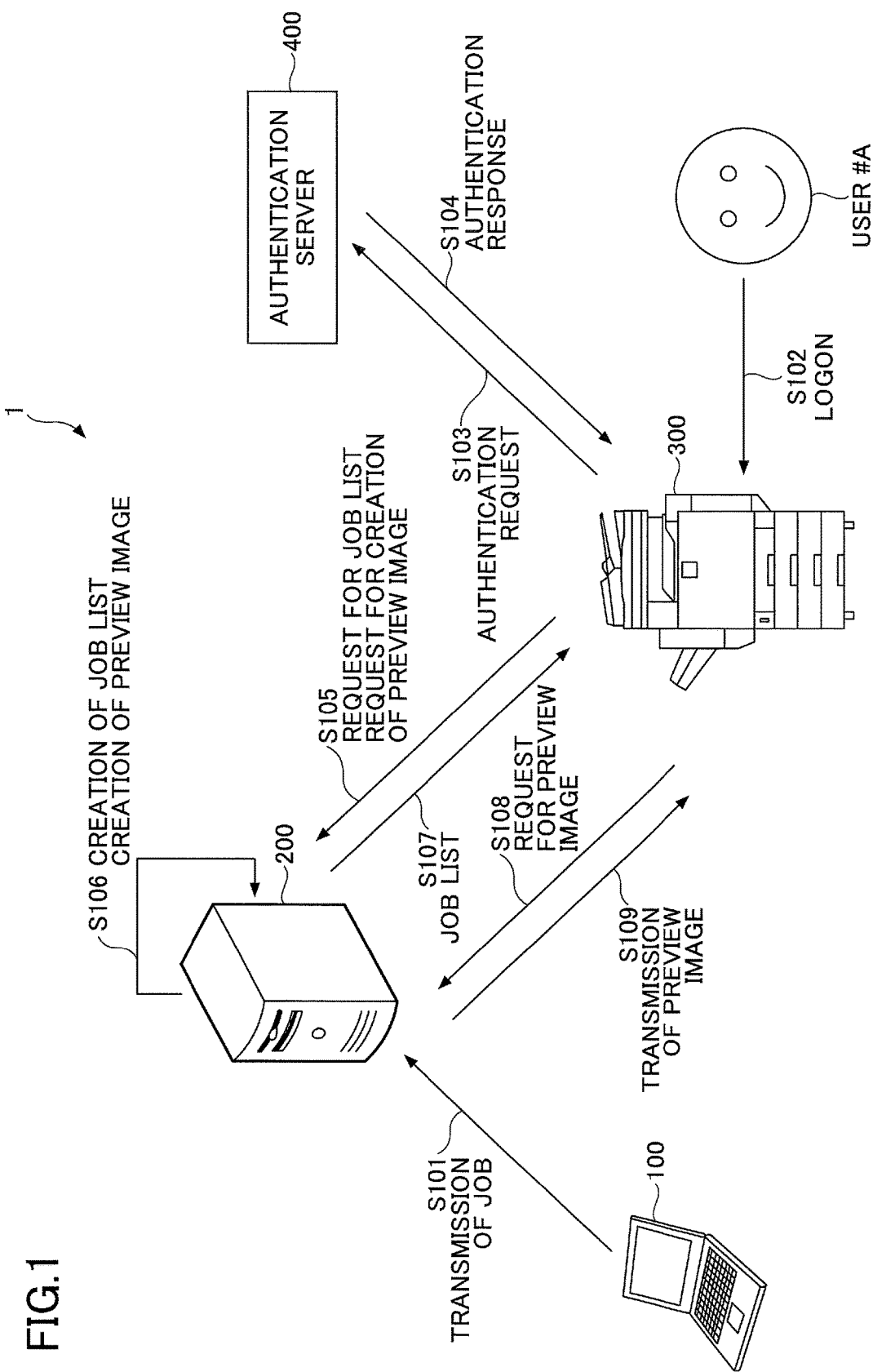
FIG. 1 is a diagram illustrating a general arrangement of a pull printing system according to a first embodiment.
Figure 2:
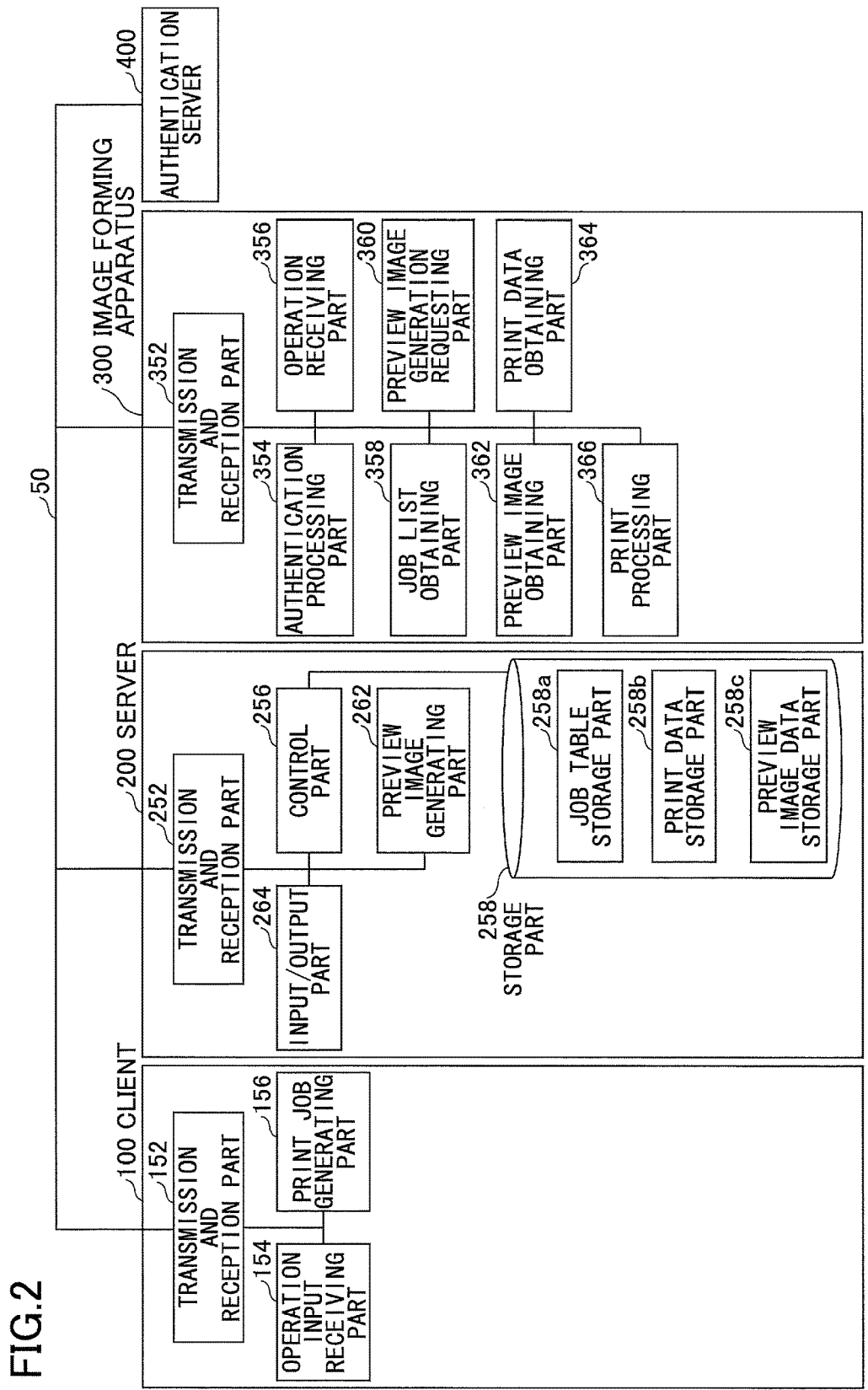
FIG. 2 is a diagram depicting a functional arrangement according to the first embodiment.

A general arrangement of a system and a functional arrangement of apparatuses of the system according to a first embodiment are described. FIG. 1 is a diagram illustrating a general arrangement of a pull printing system 1. FIG. 2 is a diagram depicting a functional arrangement of the pull printing system 1. The pull printing system 1 includes a client apparatus ("client") 100, a server apparatus ("server") 200, an image forming apparatus 300, and an authentication server 400, all of which are interconnected by a communications network 50 (FIG. 2). The communications network 50 is not limited to a particular communications system. The client 100, the server 200, the image forming apparatus 300, and the authentication server 400 may be interconnected using for example, Ethernet (registered trademark) and Transmission Control Protocol/Internet Protocol (TCP/IP), or alternatively be interconnected via a local area network (LAN), a virtual private network (VPN), and a dedicated line.

An operation sequence of the pull printing system 1 is described with reference to FIGS. 1 and 2.

At step S101, a print job (hereinafter "job") is transmitted from the client 100 of User #A to the server 200.

At step S102, User #A logs on to the image forming apparatus 300. For example, User #A enters a user ID and password into the image forming apparatus 300.

At step S103, an authentication request is transmitted from the image forming apparatus 300 to the authentication server 400. The authentication request includes the user ID and password.

At step S104, the image forming apparatus 300 receives a response to the authentication request from the authentication server 400. Once the user ID and password are normally authenticated, User #A is enabled to use various functions of the image forming apparatus 300.

At step S105, the image forming apparatus 300 requests a list of jobs executable by User #A from the server 200.

At step S106, the server 200 generates a list of jobs associated with User #A, and also generates the preview images of such jobs. As described below, the preview images may alternatively be generated when the jobs are received at step S101, and the amount of data of the generated preview images may be controlled so as not to overload the server 200.

Here, to generate a preview image is to generate data for display converted into, for example, a JPEG image. A preview image is generated for each page of print data.

At step S107, the server 200 transmits the list of jobs to the image forming apparatus 300.

At step S108, the image forming apparatus 300 transmits a request for preview images at the request of User #A. The request for preview images includes identifiers (job IDs) for identifying jobs and the number of pages of the requested preview images.

At step S109, the server 200 transmits preview images to the image forming apparatus 300. The transmitted preview images are displayed on an operation receiving part 356 of the image forming apparatus 300. User #A can check the preview images displayed on the operation receiving part 356 to determine whether to perform printing. Furthermore, when User #A specifies a job and requests printing, the server 200 transmits print data to the image forming apparatus 300, and the image forming apparatus 300 executes printing of the received print data.

Here, the client 100 is an example of a client apparatus, and the server 200 is an example of an information processing apparatus. Furthermore, a combination of the server 200 and the image forming apparatus 300 is an example of an information processing system.

Next, a functional arrangement of the server 200 according to the first embodiment is described with reference to FIG. 2.

The server 200 includes a transmission and reception part 252, an input/output part 264, a control part 256, a preview image generating part 262, and a storage part 258.

The transmission and reception part 252 receives a job from the client 100. The preview image generating part 262 generates a preview image of print data included in the job. The transmission and reception part 252 transmits the generated preview image to the image forming apparatus 300.

When a first print language is used in the print data, the preview image generating part 262 limits generation of preview images of the print data on a page basis.

When a second print language is used in the print data, the preview image generating part 262 limits generation of preview images of the print data on a time basis.

Specifically, in the case of limiting generation of preview images of the print data on a page basis, the preview image generating part 262 executes processing for generating preview images corresponding to pages in a predetermined range of the print data. In the case of limiting generation of preview images of the print data on a time basis, the preview image generating part 262 executes processing for generating preview images corresponding to print data starting from a predetermined page of the print data within a predetermined time.

Here, use of the first or second print language for print data may be expressed as use of the first or second print language for a job.

For example, the preview image generating part 262 sets a predetermined period with respect to a timer for preview image generation, and generates preview images while the timer is active. The timer may be activated when the preview image generating part 262 starts to generate preview images. The predetermined period is variable.

Here, the predetermined period is an example of a period set based on a time-related condition.

Examples of the first print language include Refined Printing Command Stream (RPCS) and Printer Control Language (PDL). In the case of using these print languages, it is possible to generate preview images for print data by specifying a page range of the print data. When the first print language is used, a setting to generate preview images of, for example, "pages 1 through 10" of the print data is provided in the server 200.

Examples of the second print language include PostScript (PS) and Portable Document Format (PDF). In the case of using the second print language, unlike in the case of using the first print language, it is not possible to cause the server 200 to generate preview images for print data by specifying a page range of the print data. Therefore, in the case of using the second print language, preview images are generated using a timer for preview image generation.

A manager of the server 200 may adjust the length of the timer in multiple levels in view of an operational load on the server 200. For example, the manager inputs "LONG", "NORMAL", or "SHORT" to the timer. The server 200 may set the timer to a period commensurate with the input.

According to a first generation process, the preview image generating part 262 generates a preview image in response to reception of a job. In this case, the preview image generating part 262 starts to generate a preview image when the server 200 receives the job.

According to the first generation process, if the preview image is already generated when the image forming apparatus 300 requests the server 200 to transmit the preview image, the server 200 can transmit the preview image in response to the request. In this case, the preview image is immediately displayed on the image forming apparatus 300 to serve the convenience of users. However, because a preview image of which it is not sure whether a preview will be requested by a user is generated and stored, an operational load on the server 200 increases.

According to a second generation process, the preview image generating part 262 generates a preview image in response to a request from the image forming apparatus 300. In this case, a preview image requested by a user is generated. Therefore, the server 200 can efficiently generate a preview image to be previewed. The user, however, is kept waiting before generation of the preview image. Accordingly, the convenience of users is reduced.

The request from the image forming apparatus 300 for transmission of a preview image includes information that specifies a page or pages of preview images. If a preview image of the specified page or pages is not generated, the preview image generating part 262 generates a preview image that is not generated. In this case, at least one of the first generation process and the second generation process is executed, for example, in the following manner. The server 200 generates preview images of pages 1 through 10 in response to reception of a job. In response to a request from the image forming apparatus 300 for preview images, the server 200 transmits the preview images of pages 1 through 10. In response to a request from the image forming apparatus 300 for preview images of page 11 and the subsequent pages, the server 200 generates preview images of page 11 and the subsequent pages, and transmits the generated preview images to the image forming apparatus 300.

The storage part 58 includes a job table storage part 258a, a print data storage part 258b, and a preview image data storage part 258c.

The job table storage part 258a stores attribute information related to jobs received from the client 100. FIG. 3 illustrates a job table in which items of attribute information stored in the job table storage part 258a are described.

A job ID, which is the identifier of a job, is stored together with the attributes of the job in the job table. Specifically, items such as "Job Name," "User ID," which represents a user who is a transmitter of the job, "Job Input Date and Time," which is the date and time of reception of the job by the server 200, printing-related attributes ("Number of Copies," "Number of Pages," "Duplex Information," and "Color Information"), "Print Data Retaining Destination," which indicates a location where print data included in the job are retained, "Preview Image Retaining Destination," which indicates a location where a preview image is retained, "Presence or Absence of Preview Image," which indicates whether to generate a preview image, and "Preview Image Generation State" are stored in correlation with the job ID.

When "Presence or Absence of Preview Image" is "OFF," the preview image generating part 262 does not generate a preview image.

In "Preview Image Generation State," for example, "Before Generation," which indicates that a preview image is not generated, "Being Generated," which indicates that processing for generating a preview image is in execution, "Generation Completed," which indicates completion of generation of a preview image, or "Error" is set. The job table storage part 258a may store the number of pages of a generated preview image in addition to "Preview Image Generation State."

The print data storage part 258b stores print data included in jobs. The control part 256 and the preview image generating part 262 refer to the job table storage part 258a to specify a location where print data are retained.

The preview image data storage part 258c stores preview image data generated by the preview image generating part 262. The control part 256 and the preview image generating part 262 refer to the job table storage part 258a to specify a location where a preview image is retained.

A preview image may be retained in a temporary folder during the generation of the preview image, and be moved to a folder of the preview image data storage part 258c when the preview image is generated for a predetermined number of pages.

The input/output part 264 of the server 200 receives settings of processing related to preview image generation from the manager. The input/output part 264 notifies the control part 256 of the contents of the processing, and the control part 256 instructs the storage part 258 to store the settings information. The control part 256 and the preview image generating part 262 execute processing for preview image generation while referring to the settings stored in the storage part 258.

For example, the items presented in FIG. 4 may be provided as setting items of the processing related to preview image generation.

Referring to FIG. 4, "(a) Preview Image Generation" is an item for setting whether to generate a preview image. If the setting value is "YES," the preview image generating part 262 generates a preview image. If the setting value is "NO," the preview image generating part 262 does not generate a preview image.

Next, "(b) Preview Image Preparation" is an item for setting whether to generate a preview image. If the setting value is "YES," the preview image generating part 262 generates a preview image in response to reception of a job from the client 100. That is, the preview image generating part 262 executes the first generation process. If the setting value is "NO," the preview image generating part 262 does not execute the first generation process.

Next, "(c) Maximum Number of Processes of Preview Image Generation" is an item for setting the number of executable processes of preview image generation that the preview image generating part 262 can simultaneously activate. Generation of a preview image imposes a large operational load on the server 200. Therefore, such an item is provided to limit the number of simultaneously executable processes.

Therefore, the preview image generating part 262 distributes print data for which a preview image or preview images are to be generated among processes of preview image generation within the upper limit of "Maximum Number of Processes of Preview Image Generation", and executes the processes.

Next, "(d) Second Print Language Preview Images" is an item for setting whether to generate "All" preview images or "Some" preview images.

Next, "(e) Amount of Generation of Second Print Language Preview Images" is an item for setting a period for preview image generation when "Some" is selected for "(d) Second Print Language Preview Images." The period may be directly set by a user. Average users, however, are not aware how many preview images are generated on average during a set period. In view of this, here, setting values of "Large," "Normal," and "Small" are settable for this item. Therefore, information correlating each setting value and a corresponding period for preview image generation (a corresponding timer length for preview image generation) is retained in advance. A predetermined period (or timer length) correlated with a selected setting value is set in the storage part 258. The timer length for preview image generation is longest when "Large" is selected, is medium when "Normal" is selected, and is shortest when "Small" is selected. For example, the timer length may be 30 seconds for "Large," 20 seconds for "Normal," and 10 seconds for "Small." The setting values for "(e) Amount of Generation of Second Print Language Preview Images" may be determined in any number of levels other than the three levels illustrated by way of example in FIG. 4. The setting as to whether to generate all or some preview images and the setting as to the amount of preview image generation may also be set for the first print language. In the case of the first print language, however, not a timer length but the range (number of pages) of preview image generation is set with respect to the amount of preview image generation. Furthermore, with respect to the first print language or the second print language, a preset value (number of pages or predetermined period) may be set in response to selection of "Some." In the following description, it is assumed that with respect to the setting of the amount of preview image generation, a preset value (ten pages) is set for the first print language and a selected setting value is set for the second print language.

The preview image generating part 262 executes various kinds of processing in accordance with the setting of each setting item of FIG. 4.

Figure 5:
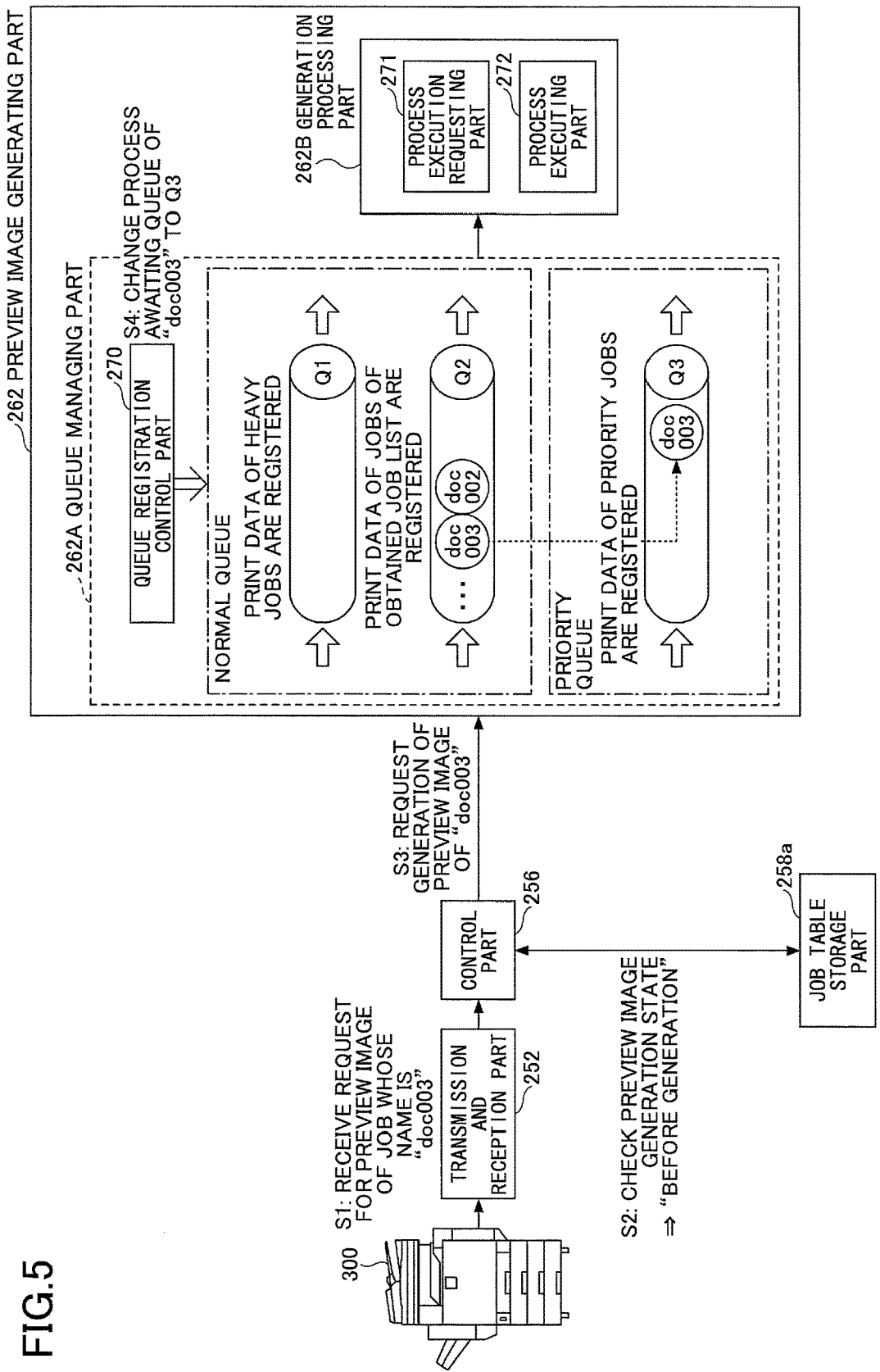
FIG. 5 is a diagram illustrating a process of preview image generation according to the first embodiment.

FIG. 5 is a diagram illustrating a process of preview image generation in the preview image generating part 262. Referring to FIG. 5, the preview image generating part 262 includes a queue managing part 262A and a generation processing part 262B. The queue managing part 262A manages the order of generation of preview images, and includes a queue registration control part 270 and process awaiting queues Q1, Q2, and Q3. The generation processing part 262B includes a process execution requesting part 271 and a process executing part 272.

For example, in the case where "(c) Maximum Number of Processes of Preview Image Generation" of FIG. 4 is set to three, a generation processing part 262B of the preview image generating part 262 simultaneously activates three processes. When the number of processes that are being activated reaches three, the generation processing part 262B stops activating a new process. When the number of processes that are being activated falls below three, the generation processing part 262B starts a new process of preview image generation. Specifically, the generation processing part 262B obtains print data from the queue managing part 262A to newly start preview image generation.

The generation processing part 262B determines whether the print data are in the first print language or the second print language. When the print data are in the second print language, the generation processing part 262B checks the setting values of "(d) Second Print Language Preview Images" and "(e) Amount of Generation of Second Print Language Preview Images" of FIG. 4, and sets a timer according to the setting values. When "All" is selected for "(d) Second Print Language Preview Images" of FIG. 4, the timer is set to "No Limit (Limitless)" or a possible sufficiently long period (for example, 10 minutes).

The preview image generating part 262 controls the order of distribution of preview image generation processes corresponding to multiple print data items based on the attributes of jobs corresponding to the print data.

The preview image generating part 262 may be configured to refer to the priorities of users stored in the storage part 258 to preferentially generate preview images for users of higher priorities. Furthermore, the preview image generating part 262 may be configured to preferentially generate a preview image requested from the image forming apparatus 300 over preview images in other cases.

The queue registration control part 270, for example, manages and changes the order of queues, which manages the order of generation of preview images. In the case illustrated in FIG. 5, the queue registration control part 270 simultaneously manages the three process awaiting queues Q1, Q2, and Q3. The number of queues managed by the queue registration control part 270 may be set to any value. When the number of queues managed by the queue managing part 262A is one, the queue registration control part 270 may change the order of jobs in the queue.

A queue of print data of heavy jobs is registered with the process awaiting queue Q1 when jobs are received from the client 100. Heavy jobs refer to, for example, jobs whose number of pages to be subjected to preview image generation is so large as to render the operational load of preview image generation heavy. Whether the number of pages is large may be determined by whether the number of pages is greater than or equal to a predetermined reference value (for example, a hundred pages).

A queue of print data of jobs that are not heavy is registered with the process awaiting queue Q2 when jobs are received from the client 100. Furthermore, a queue of print data of jobs included in a job list obtained by the image forming apparatus 300 is registered with the process awaiting queue Q2. Here, the process awaiting queue Q1 and Q2 may be referred to as normal queues.

A queue of print data of registered jobs for which a preview image is to be preferentially generated is registered with the process awaiting queue Q3. The process awaiting queue Q3 may be referred to as a priority queue.

Next, functions of the generation processing part 262B are described. The process execution requesting part 271 is activated for each process of preview image generation. The process execution requesting part 271 instructs the process executing part 272 to generate a preview image, based on a queue managed by the queue managing part 262A. Furthermore, the process execution requesting part 271 manages the execution time of each process using, for example, a timer, and instructs the process executing part 272 to terminate a process of preview image generation that has been executed for a predetermined time. The process executing part 272 generates a preview image based on an instruction from the process execution requesting part 271.

An operation of the server 200 at the time of reception of a request from the image forming apparatus 300 for a preview image of a specified job is described.

Referring to FIG. 5, at step S1, the control part 256 of the server 200 receives a request from the image forming apparatus 300 for a preview image of a specified job via the transmission and reception part 252. The request includes a job name "doc003." In response to reception of the request, the control part 256 refers to the job table storage part 258a to check the generation state of a preview image or preview images ("preview image generation state") of "doc003."

When the control part 256 determines at step S2 that the preview image generation state of "doc003" is "Before Generation," at step S3, the control part 256 requests the preview image generating part 262 to generate a preview image.

At step S4, the queue managing part 262A of the preview image generating part 262 determines that "doc003" is registered with the process awaiting queue Q2. The queue managing part 262A determines that the print data of "doc003" has to be preferentially handed to the generation processing part 262B, and changes the process awaiting queue of the print data of "doc003" to the process awaiting queue Q3.

Specifically, the queue managing part 262A registers the queue of "doc003" with the process awaiting queue Q3, and deletes the queue of "doc003" registered with the process awaiting queue Q1 or Q2.

As a result, the generation processing part 262B can start to process the print data of "doc003" earlier to reduce time before transmitting a generated preview image to the image forming apparatus 300.

That is, while a user is not believed to be in front of the image forming apparatus 300 when a job is transmitted from the client 100, a user is believed to wish to view a preview image by operating the image forming apparatus 300 when the user specifies a particular job on the image forming apparatus 300 to request a preview image of the particular job. Therefore, it is more convenient to address the latter case earlier than the former case. Therefore, the job is registered with a normal queue in the former case, and is registered with a priority queue in the latter case.

The transmission and reception part 252 transmits and receives jobs, preview images, and various kinds of data via the communications network 50.

The transmission and reception part 252 is an example of a transmitter or a receiver.

As described above, according to pull printing, there is a time lag between when a job is input to the server 200 and when a user specifies the job to perform printing in the image forming apparatus 300, and there are the first generation process and the second generation process by which the server 200 generates a preview image.

According to the first generation process, generation of a preview image is requested (or started) during the time lag. Therefore, the first generation process has the advantage of good responsiveness to a user's request from the image forming apparatus 300 for a preview image.

On the other hand, a preview image of part or the entirety of the job is generated at a time by the first generation process. Therefore, for example, if the user prints print data without a preview, it turns out that the server 200 has generated a preview image that is not used and has executed the process in vain. In this sense, the first generation process may have the disadvantage of increasing an operational load on the server 200.

For example, in the case of generating a preview image of a job according to the second generation method, the server 200 does not start to generate a preview image when the job is input to the server 200. Therefore, as described above, there is the advantage that it is possible to prevent an increase in an operational load on the server 200. On the other hand, because generation of a preview image is started after a user requests a preview image on the image forming apparatus 300, there may be the disadvantage of poor responsiveness.

According to the first embodiment, a user can strike a balance between the above-described advantages and disadvantages by setting whether to use the first generation process or the second generation process to generate a preview image in the server 200 and setting the range of pages for which to generate preview images and a limit to a generation time. Therefore, the server 200 can efficiently generate preview images. In addition, a user can flexibly set a process of preview image generation and various parameters in the process in the server 200. Accordingly, it is possible to provide a suitable process of preview image generation in accordance with a user's usage environment.

A functional arrangement of the client 100 is described with reference to FIG. 2. The client 100 includes a transmission and reception part 152, an operation input receiving part 154, and a print job generating part 156.

The operation input receiving part 154 receives an operation input from a user of the client 100. For example, the operation input receiving part 154 receives a print instruction to print specified data.

The print job generating part 156 generates a job corresponding to data with respect to which the operation input receiving part 154 receives a print instruction from a user. The print job generating part 156 requests the transmission and reception part 152 to transmit the generated job to the server 200.

In response to reception of an instruction from the print job generating part 156, the transmission and reception part 152 transmits the job to the server 200 using the communications network 50.

A functional arrangement of the image forming apparatus 300 is described with reference to FIG. 2. The image forming apparatus 300 includes a transmission and reception part 352, an authentication processing part 354, the operation receiving part 356, a job list obtaining part 358, a preview image generation requesting part 360, a preview image obtaining part 362, a print data obtaining part 364, and a print processing part 366.

The transmission and reception part 352 transmits data to and receives data from the server 200 via the communications network 50.

Figure 9:
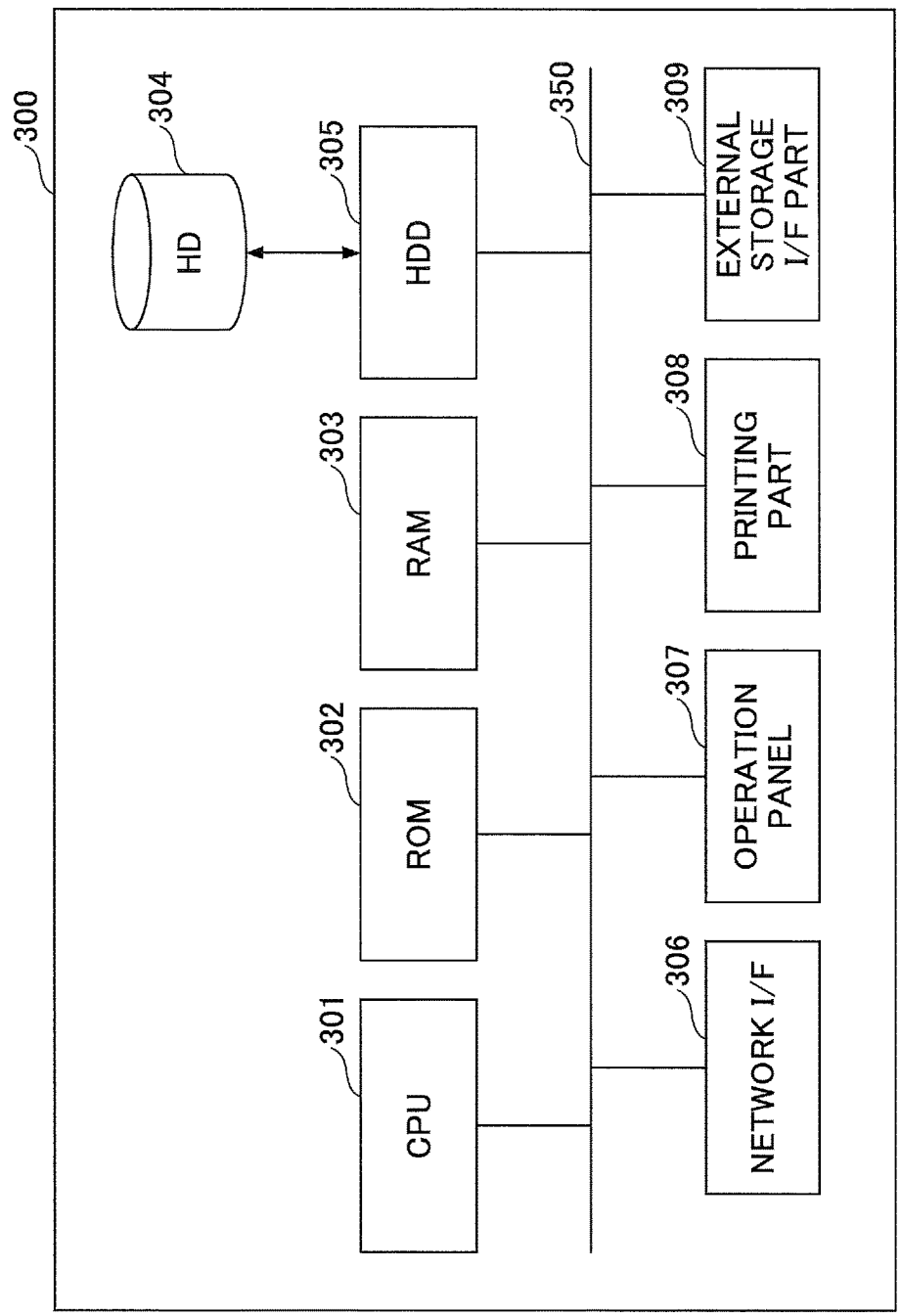
FIG. 9 is a diagram depicting a hardware arrangement of the image forming apparatus according to the first embodiment.

The authentication processing part 354 requests the authentication server 400 to perform user authentication. For example, the authentication processing part 354 requests a user to enter the user ID and password of the user on a logon screen displayed on an operation panel 307 (FIG. 9).

The authentication processing part 354 transmits the user ID and password to the authentication server 400 via the transmission and reception part 352. The authentication server 400 determines whether to allow the user to log on to the image forming apparatus 300 in accordance with whether a combination of the user ID and password of the user transmitted from the image forming apparatus 300 is stored.

In place of entering a user ID and password, an information recording medium carried by a user, for example, a card such as an IC card or a portable terminal, may be used to perform authentication. In this case, for example, when a user places an IC card over a card reader of the image forming apparatus, a card ID and password stored in the IC card are input to the authentication processing part 354, and the authentication server 400 determines whether the authentication has succeeded in accordance with whether a combination of the card ID and password transmitted from the image forming apparatus 300 is stored.

Alternatively, the authentication processing part 354 may perform user authentication without using the authentication server 400. In this case, a combination of a user ID and password or a card IC and password that is allowed to use the image forming apparatus 300 is stored. The authentication processing part 354 executes the same authentication process as is executed in the authentication server 400.

The job list obtaining part 358 obtains a list of the jobs (job list) of a logon user who has logged on to the image forming apparatus 300 from the server 200.

The preview image generation requesting part 360 transmits a signal requesting a preview image of the print data of a job selected from the job list by the user to the server 200. Furthermore, the preview image generation requesting part 360 transmits a signal specifying particular pages and requesting the preview images of the particular pages to the server 200.

The preview image obtaining part 362 obtains (receives) a preview image of the print data (or the specified pages of the print data) of the job selected from the job list by the user from the server 200.

The print processing part 366 obtains the print data of the job selected from the job list by the user, and prints the obtained print data.

The operation receiving part 356 receives various inputs from a user and displays various kinds of information.

Screens displayed on the operation receiving part 356 are described with reference to FIGS. 6A, 6B, 7A, and 7B.

Figure 6A:
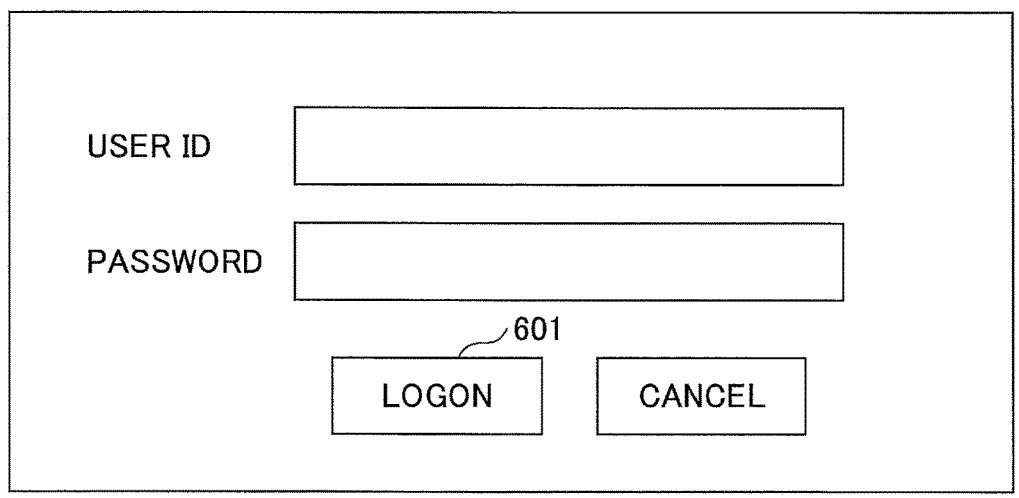
FIGS. 6A and 6B are diagrams depicting display examples of an operation panel of an image forming apparatus according to the first embodiment.

FIG. 6A depicts a screen that is displayed on the operation receiving part 356 at the time of user authentication. To log on to the image forming apparatus 300, a user enters a user ID and password and selects (depresses) a "LOGON" button 601 on the screen displayed on the operation receiving part 356. In response to reception of the selection of the "LOGON" button 601, the operation receiving part 356 transmits the entered information to the authentication processing part 354.

Figure 6B:
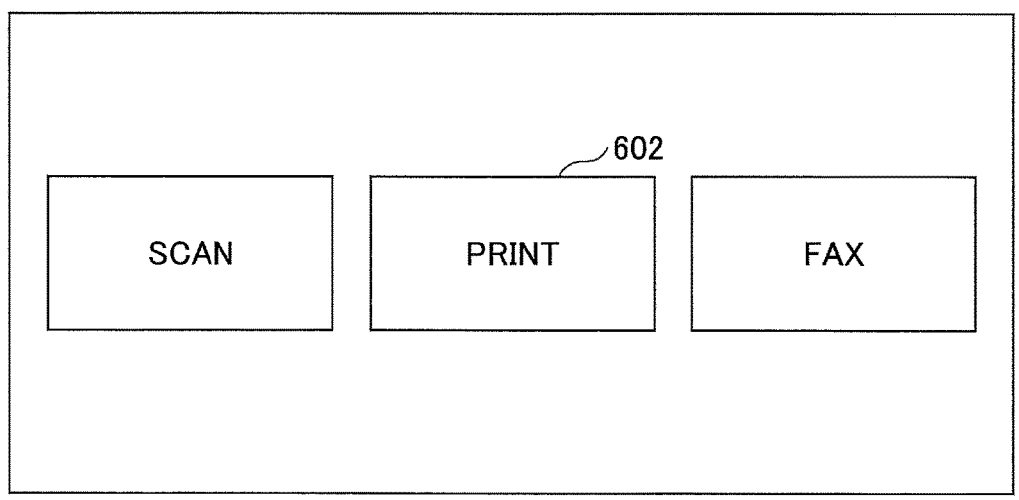

FIG. 6B depicts a screen that is displayed when a user selects a function to use. In response to detection of a user's selection of a "PRINT" button 602, the job list obtaining part 358 may start a process of obtaining a job list.

FIG. 7A depicts a screen displaying a job list of a user obtained by the job list obtaining part 358. The screen of FIG. 7A presents a job list of a user whose username is "user1." When the user selects (depresses) a "PREVIEW" button 701 after selecting a job, the preview image obtaining part 362 obtains a preview image from the server 200.

Figure 7B:
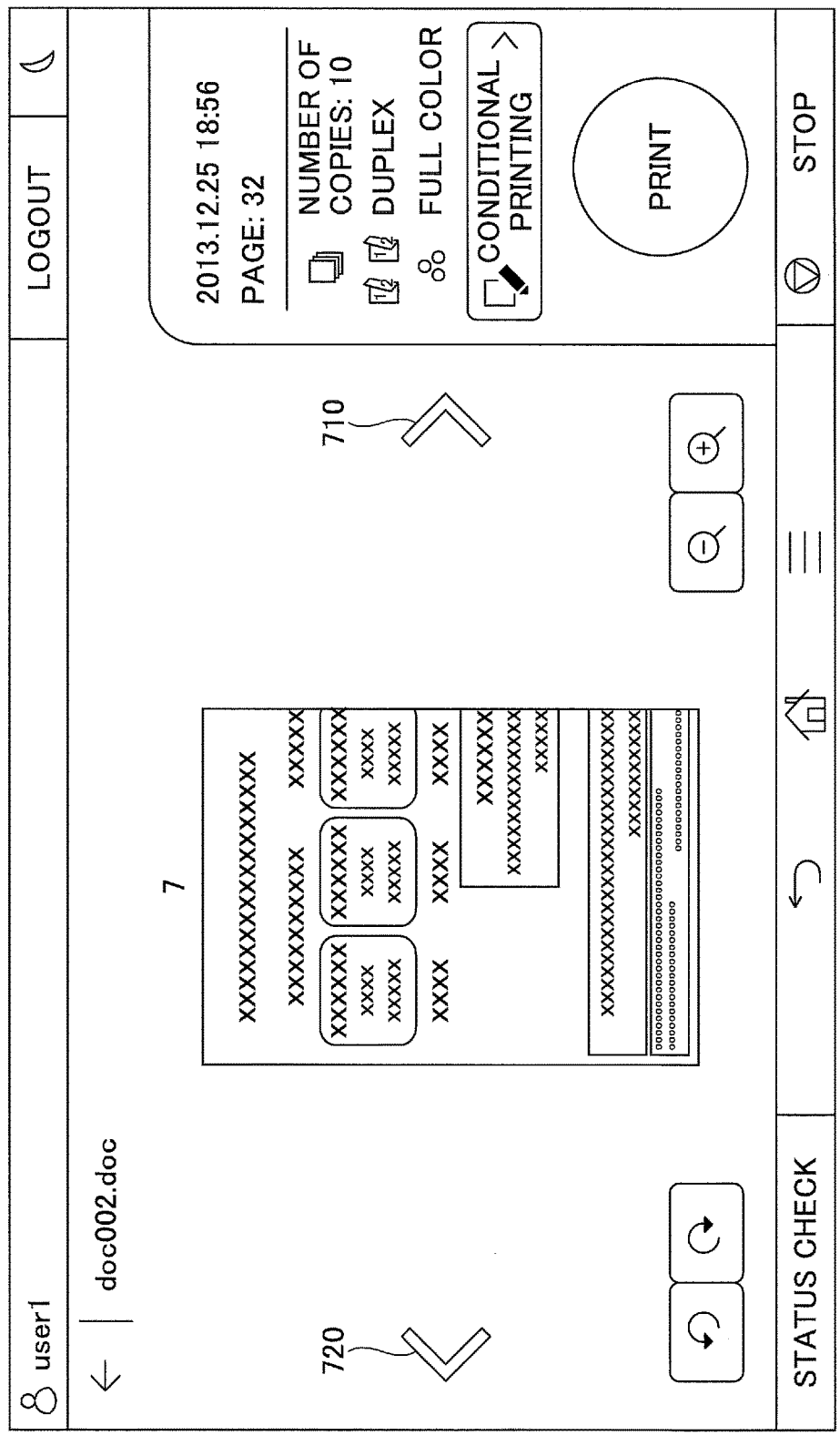

FIG. 7B depicts a screen displaying a preview image obtained by the preview image obtaining part 362. The screen of FIG. 7B is displayed when the user selects a job "doc002.doc" on the screen of FIG. 7A.

When the user selects an arrow 710 on the screen of FIG. 7B, the preview image proceeds to the next page. When the user selects an arrow 720 on the screen of FIG. 7B, the preview image returns to the previous page. When a preview image not obtained from the server 200 is selected by the user, the preview image obtaining part 362 requests the server 200 to transmit the preview image. If the preview image is not generated in the server 200 when the server 200 receives the request, the preview image generating part 262 starts processing for preview image generation in response to the reception of the request. The request may include the number of a page or the range of pages of preview images that the user wishes to display.

The server 200 may generate a preview image for the requested page or range of pages alone and transmit the generated preview image to the image forming apparatus 300. Alternatively, subsequent to a request for the start of preview image generation of a requested page, the start of preview image generation of a predetermined range of pages following the requested page may be requested, and a preview image may be transmitted to the image forming apparatus 300 when generated.

Generating preview images also for a predetermined range of pages following a requested page and transmitting the generated preview images to the image forming apparatus 300 offers more convenience to users. This makes it possible to increase the speed of displaying a preview image on the operation receiving part 356 when the user requests to check a preview image subsequent to the requested preview image.

When generation of a preview image is not supported, for example, when "NO" is set for "(a) Preview Image Generation" in the server 200, the image forming apparatus 300 does not display the "PREVIEW" button 701 of FIG. 7A or displays the "PREVIEW" button 701 at half brightness to indicate to users that the function is not available.

The operation receiving part 356 is an example of a display, and the preview image obtaining part 362 is an example of a requesting part.

Figure 8:
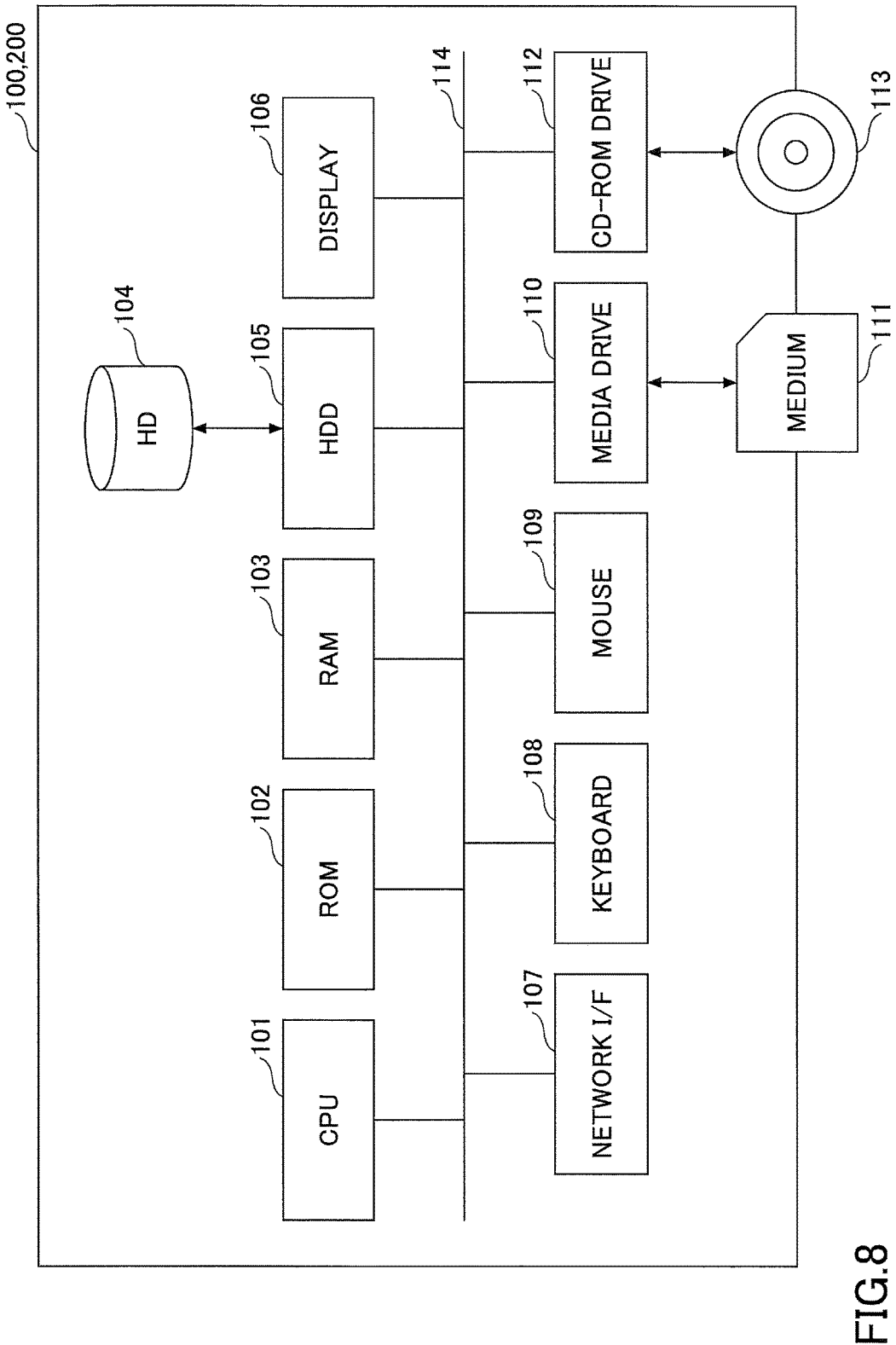
FIG. 8 is a diagram depicting a hardware arrangement of a client and the server according to the first embodiment.

A hardware arrangement of the pull printing system 1 is described. First, a hardware arrangement of a client and a server according to the first embodiment is described. FIG. 8 is a diagram depicting a hardware arrangement of the client 100. The client 100 includes a central processing unit (CPU) 101, a read-only memory (ROM) 102, and a random access memory (RAM) 103. The CPU 101 controls the overall operation of the client 100. The ROM 102 contains programs used to drive the CPU 101. The RAM 103 is used as a work area of the CPU 101. The client 100 further includes a hard disk (HD) 104 and a hard disk drive (HDD) 105. The HD 104 stores data such as programs for the client 100. The HDD 105 controls writing data to and reading data from the HD 104 under the control of the CPU 101.

Furthermore, the client 100 includes a display 106 and a network interface (I/F) 107 for performing data communications using the communications network 50. Various kinds of information, such as a cursor, menus, windows, characters, and images, are displayed on the display 106. In addition, the client 100 includes a keyboard 108 and a mouse 109. The keyboard 108 includes keys for inputting characters, numerical values, and instructions. The mouse 109 selects and executes instructions, selects objects of processing, and moves a cursor. The client 100 also includes a media drive 110 that controls reading data from and writing data to (storing data in) a recording medium 111 such as a flash memory. Moreover, the client 100 includes a compact disc read-only memory (CD-ROM) drive 112 and a bus line 114. The CD-ROM drive 112 controls reading data from and writing data to a CD-ROM 113, which is an example of detachable recording media. The bus line 114 electrically connects the above-described hardware elements as depicted in FIG. 8. Examples of the bus line 114 include an address bus and a data bus.

The CPU 101 reads and executes a program stored in, for example, the ROM 102 to implement the functions of the client 100 depicted in FIG. 2.

The server 200 basically has the same hardware arrangement as the above-described client 100. Therefore, a description of the hardware arrangement of the server 200 is omitted. According to the server 200, however, various data such as a program for controlling the server 200 are stored in the HD 104.

The CPU 101 reads and executes a program stored in, for example, the ROM 102 to implement the functions of the server 200 depicted in FIG. 2.

Next, a hardware arrangement of an image forming apparatus according to the first embodiment is described. FIG. 9 is a diagram depicting a hardware arrangement of the image forming apparatus 300. The image forming apparatus 300 includes a CPU 301, a ROM 302, and a RAM 303. The CPU 301 controls the overall operation of the image forming apparatus 300. The ROM 302 contains programs used to drive the CPU 301. The RAM 303 is used as a work area of the CPU 301. The image forming apparatus 300 further includes an HD 304 and an HDD 305. The HD 304 stores data such as image data, document data, programs, fond data, form data, and programs for the image forming apparatus 300. The HDD 305 controls reading data from and writing data to the HD 304 under the control of the CPU 301.

Furthermore, the image forming apparatus 300 includes a network I/F 306 for performing data communications using the communications network 50, the operation panel 307, and a printing part 308. The operation panel 307 displays various kinds of information, such as menus, windows, characters, and images, and includes keys for inputting characters, numerical values, and various instructions. The printing part 308 performs various printing processes in accordance with operations of the operation panel 307. Moreover, the image forming apparatus 300 includes an external storage I/F 309 and a bus line 350. The external storage I/F 309 is an interface for connecting to external storage media such as a universal serial bus (USB) flash memory, a SmartMedia (registered trademark) (SM), a CompactFlash (registered trademark)(CF), a Secure Digital (registered trademark) (SD) memory card, a miniSD (registered trademark) card, a microSD (registered trademark) card, a Memory Stick (registered trademark), and an xD-Picture Card (registered trademark). The bus line 350 electrically connects the above-described hardware elements as depicted in FIG. 9. Examples of the bus line 350 include an address bus and a data bus.

The CPU 301 reads and executes a program stored in, for example, the ROM 302 to implement the functions of the image forming apparatus 300 depicted in FIG. 2.

Next, an operation sequence of preview image generation is described with reference to FIGS. 10, 11, and 12.

Figure 10:
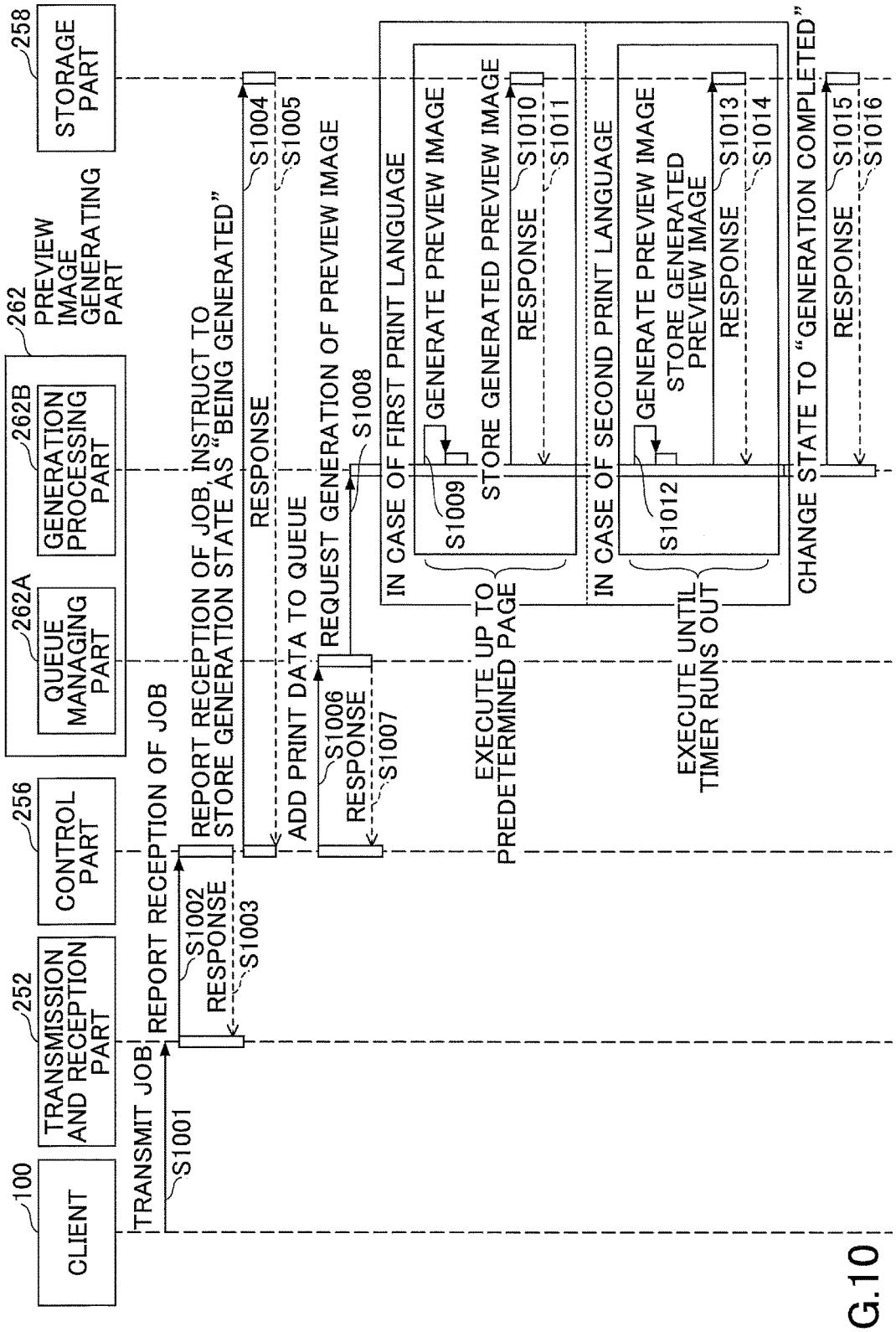
FIG. 10 is a diagram illustrating an operation sequence of preview image generation according to the first embodiment.

FIG. 10 is a diagram illustrating an operation sequence of preview image generation at the time when the server 200 receives a job from the client 100.

At step S1001, the transmission and reception part 252 receives a job transmitted from the client 100.

At step S1002, the transmission and reception part 252 reports the reception of the job to the control part 256.

At step S1003, the transmission and reception part 252 receives a response from the control part 256.

At step S1004, the control part 256 refers to the setting as to whether to prepare a preview image. If the setting indicates preparation of a preview image, the control part 256 reports the reception of the job to the storage part 258, and instructs the storage part 258 to store the preview image generation state of the job as "Being Generated." The storage part 258 stores the reported job and the attribute information of the job. If the setting indicates no preparation of a preview image, the control part 256 instructs the storage part 258 to store the preview image generation state of the job as "Before Generation." Here, it is assumed that the server 200 is set to prepare a preview image.

At step S1005, the storage part 258 transmits a response to the control part 256.

At step S1006, the control part 256 instructs the queue managing part 262A to add the print data of the job to a queue. At this point, the control part 256 may instruct the queue managing part 262A whether the print data are to be added to a "normal queue" or "priority queue." The print data may be added to a "normal queue" because this generation of a preview image is responsive to transmission of a job from the client 100. In response to the instruction, the queue managing part 262A executes a process of registering the print data with a queue.

At step S1007, the queue managing part 262A transmits a response to the control part 256. The response includes information indicating the addition of the print data to a queue.

At step S1008, the queue managing part 262A transmits a request for generation of a preview image to the generation processing part 262B in response to a queue obtaining request from the generation processing part 262B. The generation request is transmitted when the added print data's turn for a process of preview image generation comes.

The process execution requesting part 271 of the generation processing part 262B identifies the print language of the job of which a preview image is to be generated. When it is determined that the job is generated in the first print language, the process of steps S1009 through S1011 is executed. When it is determined that the job is generated in the second print language, the process of steps S1012 through S1014 is executed.

First, the case where the job is generated in the first print language is described.

At step S1009, the generation processing part 262B generates preview images. Specifically, the process execution requesting part 271 specifies the number of pages of a predetermined range from the first (initial) page of the print data, and requests the process executing part 272 to generate preview images. In response to the request from the process execution requesting part 271, the process executing part 272 generates preview images of the specified number of pages.

At step S1010, the generation processing part 262B transmits the generated preview image to the preview image data storage part 258c of the storage part 258. The preview image data storage part 258c stores the received preview image.

At step S1011, the generation processing part 262B receives a response indicating the storage of the preview image from the storage part 258.

Each time a preview image corresponding to a page-long print data is generated, the generated preview image may be stored in a temporary folder of the storage part 258 before preview images corresponding to a predetermined range of pages of the print data are generated. In this case, for example, after generation of preview images corresponding to a predetermined range of pages, the preview images may be encrypted, and the storage part 258 may ultimately store the encrypted preview images in a predetermined area of the preview image data storage part 258c. Furthermore, for example, after generation of preview images, the storage part 258 may store the preview images in an area of a high security level.

Next, the case where the job is generated in the second print language is described.

At step S1012, the generation processing part 262B generates preview images. The generation processing part 262B starts creating preview images from the first (initial) page of the print data. The generation processing part 262B starts activating a timer for preview image generation at the start of generating preview images. Specifically, the process execution requesting part 271 of the generation processing part 262B activates the timer when requesting the process executing part 272 to generate preview images, and the process executing part 272 generates preview images. When a predetermined period passes since the activation of the timer, the process execution requesting part 271 requests the process executing part 272 to stop generating preview images. In response to the instruction from the process execution requesting part 271, the process executing part 272 terminates the generation of preview images. When the generation of preview images of the print data ends before passage of a predetermined period passes since the activation of the timer, the process execution requesting part 271 does not have to request the process executing part 272 to stop generating preview images because the process executing part 272 reports completion of the generation of preview images to the process execution requesting part 271.

At step S1013, the generation processing part 262B transmits the preview images generated during the predetermined period to the preview image data storage part 258c of the storage part 258. The preview image data storage part 258c stores the received preview images.

At step S1014, the generation processing part 262B receives a response indicating the storage of the preview images from the storage part 258.

In this case as well, the preview images may be stored in a temporary folder of the storage part 258.

In each of the case of using the first print language and the case of using the second print language, steps S1015 and S1016 are executed after generation of the preview images.

At step S1015, the generation processing part 262B instructs the storage part 258 to change the preview image generation state of the print job to "Generation Completed." In response to reception of the instruction, the storage part 258 changes the preview image generation state in the job table storage part 258a to "Generation Completed."

At step S1016, the storage part 258 transmits a response indicating completion of the change of the preview image generation state to the generation processing part 262B.

Figure 11:
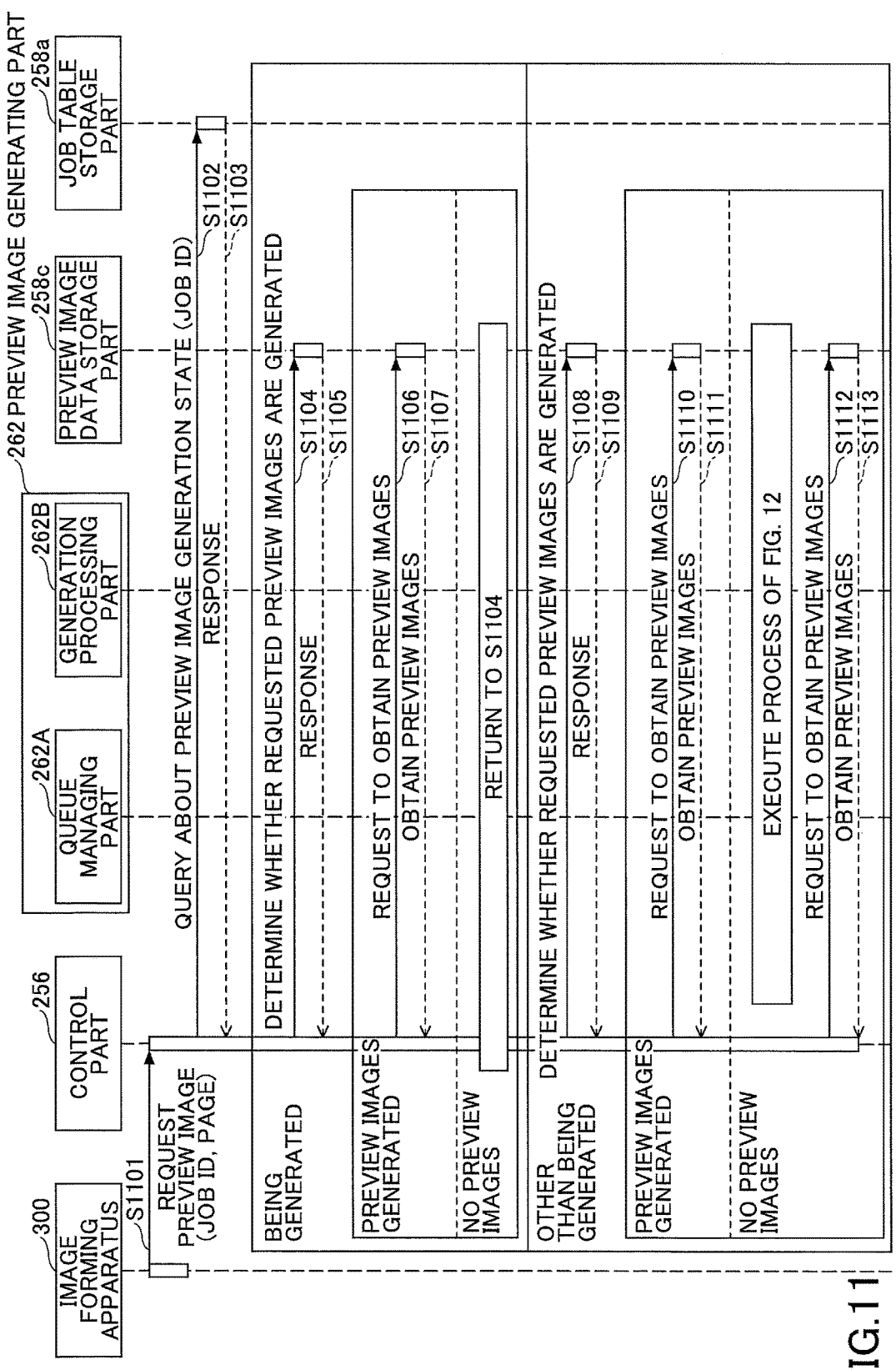
FIG. 11 is a diagram illustrating an operation sequence of preview image generation according to the first embodiment.

FIG. 11 is a diagram depicting an operation sequence of preview image generation in response to a request from the image forming apparatus 300.

At step S1101, the control part 256 receives a request for a preview image or preview images via the transmission and reception part 252. The request includes a job ID. The request may include a page number or page numbers of print data with respect to which a preview image or preview images are requested. In the following description, it is assumed that the preview image request includes page numbers of requested print data.

At step S1102, the control part 256 queries the job table storage part 258a about a preview image generation state. The query uses the job ID.

At step S1103, the control part 256 receives a response from the job table storage part 258a. The response includes information indicating a preview image generation state, such as "Before Generation," "Being Generated," or "Generation Completed." If information related to a page or pages of print data of which a preview image or preview images are generated is stored in the job table storage part 258a, the response includes the page-related information. In this case, the response includes, for example, information such as "Preview images corresponding to pages 1 through 10 have been generated."

First, a description is given of the case of "Being Generated." When the preview images are "Being Generated," the process of steps S1104 through S1107 is executed.

At step S1104, the control part 256 transmits a signal for determining whether the requested preview images are generated to the preview image data storage part 258c or a temporary folder of the storage part 258. The signal includes the job ID and information on requested pages.

At step S1105, the control part 256 receives a response. The response includes information indicating the preview image generation state of the requested preview images, namely, "Generation Completed" or "Being Generated." The response also includes information related to the pages of generated preview images.

If the preview images are already generated, the process of steps S1106 and S1107 is executed.

At step S1106, the control part 256 transmits a request to obtain preview images to the preview image data storage part 258c. The request includes the job ID and information on the requested pages.

At step S1107, the control part 256 obtains the preview images of the requested pages from the preview image data storage part 258c.

On the other hand, if the preview images are not generated, that is, if the control part 256 checks the preview image generation state and the preview images are being generated, namely, if the control part 256 receives information indicating "Being Generated," the process returns to step S1104. If the control part 256 receives information indicating "Generation Completed," the control part 256 ends the process of the case of "Being Generated." At this point, the preview image generation state changes to other than "Being Generated," and the process of step S1108 and the subsequent steps is executed.

Thus, in the case of "Being Generated," the control part 256 executes the determination process of step S1104 at predetermined intervals. The control part 256 executes the determination process until reception of a response of "Generation Completed."

Next, a description is given of other than the case where the preview images are "Being Generated." In this case, the process of step S1108 and the subsequent steps is executed.

At step S1108, the control part 256 transmits a signal for determining whether the requested preview images are generated to the preview image data storage part 258c. The signal includes the job ID and information on requested pages.

At step S1109, the control part 256 receives a response from the preview image data storage part 258c. The response includes information indicating "Before Generation" or "Generation Completed."

If the control part 256 receives a response indicating "Generation Completed," requested preview images are already generated by the preview image generating part 262. Here, the requested preview images refer to, for example, preview images that are generated as requested in accordance with settings in response to reception of print data from the client 100 as described above. Accordingly, "Generation Completed" does not necessarily mean that all of the preview images of print data are generated. On the other hand, if the control part 256 receives a response indicating "Before Generation," the preview images are not generated. The response indicating "Generation Completed" includes information on the pages of the generated preview images.

If the preview images are already generated, that is, if the control part 256 receives a response that indicates "Generation Completed" and includes information indicating that the preview images of the requested pages are generated, the process of steps S1110 and S1111 is executed.

At step S1110, the control part 256 transmits a request to obtain preview images to the preview image data storage part 258c. The request includes the job ID and information on the requested pages.

At step S1111, the control part 256 obtains the preview images from the preview image data storage part 258c.

Figure 12:
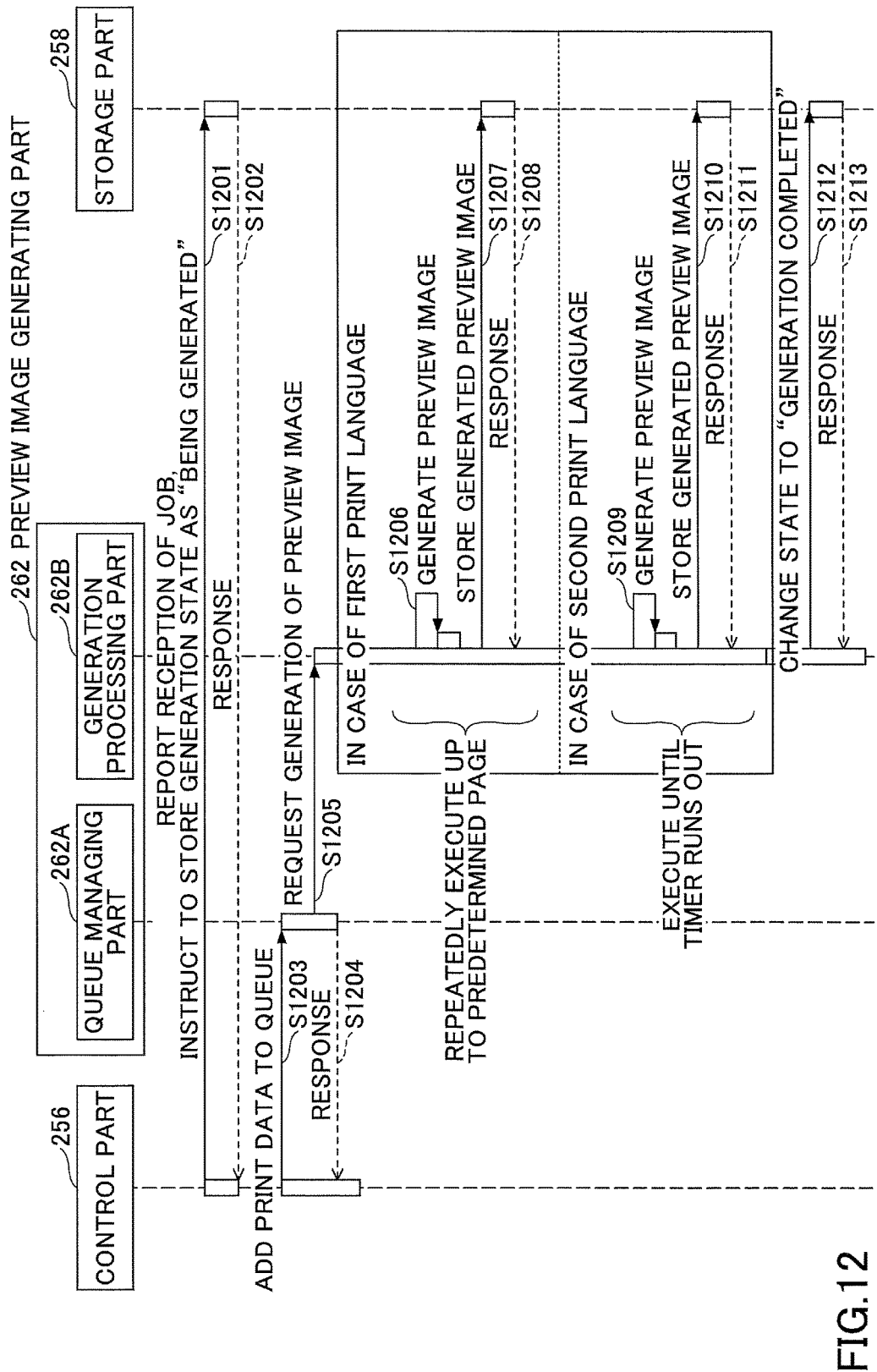
FIG. 12 is a diagram illustrating an operation sequence of preview image generation according to the first embodiment.

Next, when the preview images are not generated, for example, when the preview image generation state is "Before Generation" or when the preview image generation state is "Generation Completed" but the preview images of requested pages are not generated, a process of preview image generation depicted in FIG. 12 is executed. The process of preview image generation of FIG. 12 is described below.

When the process of preview image generation of FIG. 12 is completed, at step S1112, the control part 256 transmits a request to obtain preview images to the preview image data storage part 258c. The request includes the job ID and information on the requested pages. At step S1113, the control part 256 obtains the preview images from the preview image data storage part 258c.

If the specified (requested) preview images are not generated, the control part 256 receives an error notification indicating that the specified preview images are not generated from the preview image data storage part 258c.

Next, a description is given of FIG. 12. FIG. 12 is a diagram depicting an operation sequence of preview image generation responsive to a request from the control part 256.

The process of steps S1201 through S1213 is basically the same as the process of steps S1004 through S1016 of FIG. 10 except for step S1206, and accordingly, a description thereof is omitted.

At step S1206, in generating preview images, the process execution requesting part 271 specifies a requested page as the start page of preview image generation, and performs processing to generate preview images of the number of pages of a predetermined range. Here, the requested page (single page) alone, a preset number of pages, or the request pages and all the subsequent pages may be specified as the predetermined range.

According to FIG. 10, preview image generation starts in response to reception of a job from the client 100, while FIG. 12 illustrates operations in the case where a request for transmission of a preview image is received from the image forming apparatus 300 but the preview image is not stored in the storage part 258.

The process of preview image generation is common to the case of FIG. 10 and the case of FIG. 12. In the case of FIG. 12, however, it is highly likely that the process is executed while a user is waiting for a preview image to be displayed on the operation receiving part 356 of the image forming apparatus 300.

Therefore, the control part 256 may instruct the queue managing part 262A to preferentially handle the print data for immediate generation of preview images corresponding to the print data. In response to the instruction, the queue managing part 262A, specifically, the queue registration control part 270, may control the order by adding the print data to a priority queue so that the print data are immediately distributed among processes of preview image generation.

In either case, the server 200 transmits the preview images to the image forming apparatus 300 after execution of the above-described process.

Second Embodiment

Next, a second embodiment is described. A description of an arrangement common to the first embodiment and the second embodiment is omitted. A description is given of differences between the first embodiment and the second embodiment.

As described above, when the second print language is used in print data, the preview image generating part 262 limits generation of preview images of the print data using time as a condition.

Specifically, the preview image generating part 262 generates preview images of the print data from the first page of the print data for a predetermined period.

The preview image generating part 262 includes a timer for preview image generation, and sets a predetermined period in the timer. Accordingly, in this case, the preview image generating part 262 activates the timer at the start of generation of the preview image of the first page, and generates preview images while the timer is activated. That is, as long as the set predetermined period does not vary, the number of pages of the generated preview images, which may slightly vary depending on the processing speed at the time, is the same or approximately the same no matter how many times the preview images are generated. Furthermore, the start page cannot be specified. Therefore, if the same number of pages of preview images are generated from the first page, the preview image of a requested page may not be obtained no matter how many times the process of preview image generation is repeated. To solve this problem, the time out period of the timer may be set to "Limitless" at step S1209 of FIG. 12 of the first embodiment. As a result, all preview images are generated. Therefore, the preview image of the requested page is obtained. In contrast, the second embodiment solves this problem in a different manner.

Figure 13:
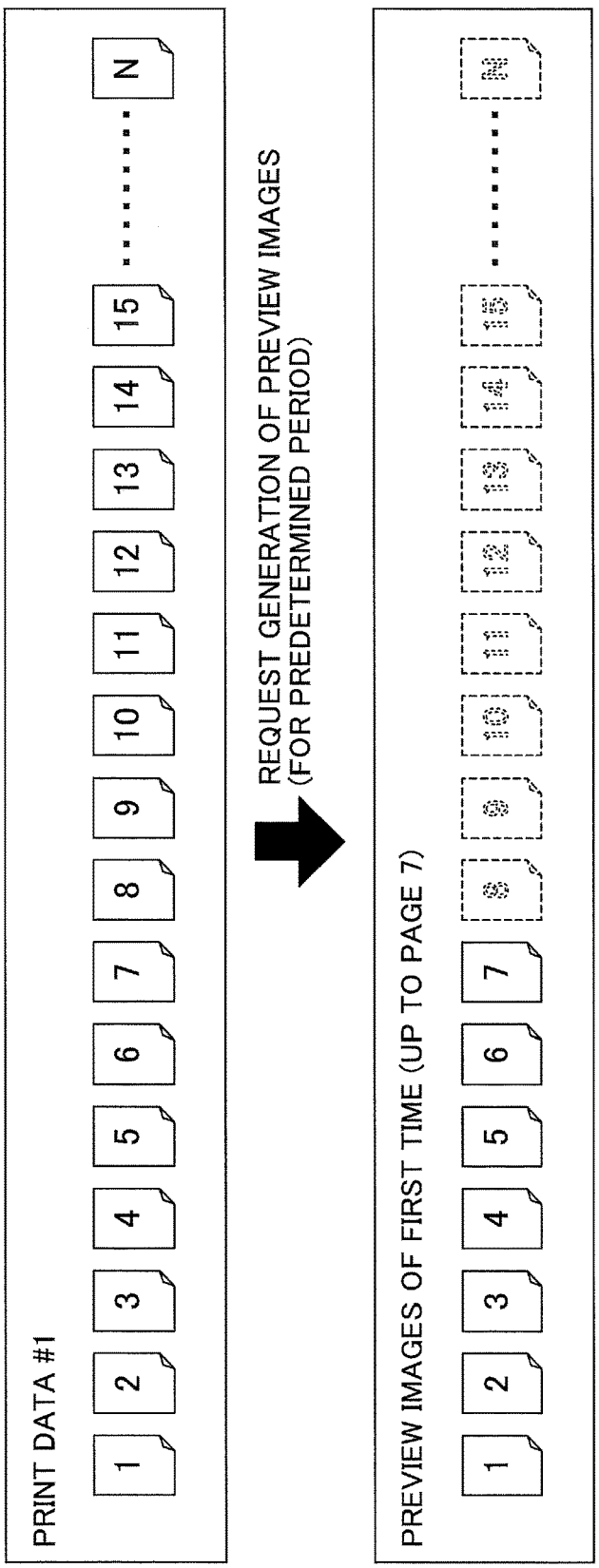
FIG. 13 is a diagram depicting the outline of a process of generating preview images of print data according to a second embodiment.

FIG. 13 is a diagram depicting the outline of a process of generating preview images of print data according to the second embodiment.

As depicted in the top block in FIG. 13, Print Data #1 are the print data of N pages (where N is a natural number). The control part 256 instructs the preview image generating part 262 to generate preview images of Print Data #1. In response to reception of the instruction, the preview image generating part 262 obtains Print Data #1 from the storage part 258, and starts to generate preview images. The preview image generating part 262 generates preview images for a predetermined period. The bottom block in FIG. 13 illustrates that the preview image generating part 262 has generated the preview images of pages 1 through 7 of the print data during the predetermined period.

Here, even if the control part 256 again instructs the preview image generating part 262 to generate preview images, the preview images of page 8 and the subsequent pages are more likely to be not generated unless the predetermined period is extended.

Considering the specifications of a print language and considering making changes in the settings of the server 200, however, it may be difficult to extend the predetermined period.

Therefore, the preview image generating part 262 may be unable to generate the requested preview images when requested by the image forming apparatus 300 to generate the preview images of page 8 and the subsequent pages.

According to the second embodiment, when generating preview images for the second time, namely, when requested to generate preview images with respect to pages whose preview images are not generated in the first preview image generation process, the preview image generating part 262 generate the preview images from print data for the second preview image generation process that are generated from the print data of the first preview image generation process.

Figure 14:
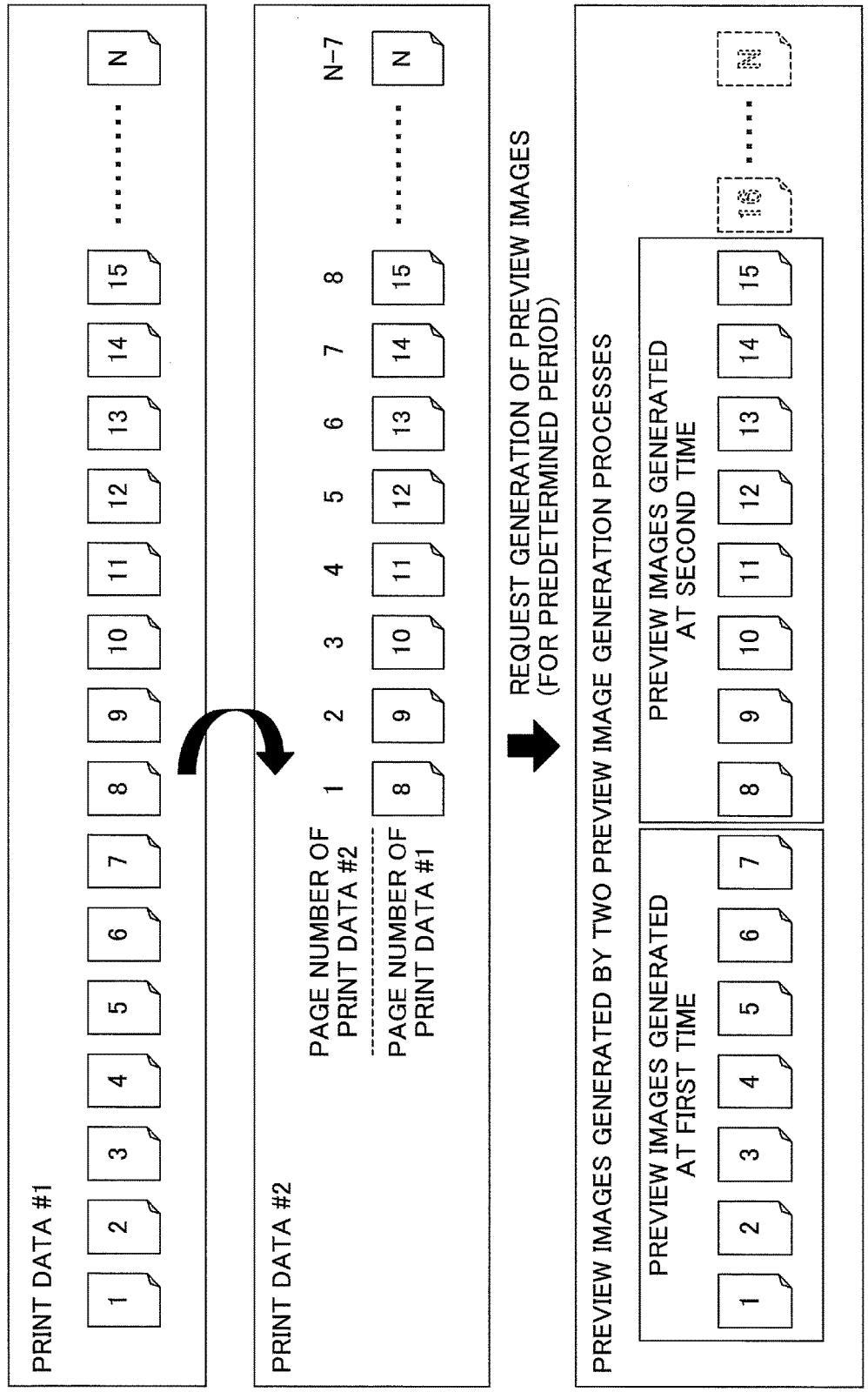
FIG. 14 is a diagram depicting the outline of a process of generating preview images of print data according to the second embodiment.

FIG. 14 is a diagram depicting an outline of a process of generating preview images of print data according to the second embodiment.

The top block and the middle block in FIG. 14 illustrate the outline of a process of generating print data for the second preview image generation process from the print data of the first preview image generation process.

As a result of the process of FIG. 13, the preview images of pages 1 through 7 of Print Data #1 are generated. The control part 256 generates Print Data #2 that are Print Data #1 from which data corresponding to pages 1 through 7 whose preview images are already generated are excluded. The data of the first page of Print Data #2 corresponds to the data of page 8 of Print Data #1. The storage part 258 stores Print Data #2 based on the instruction of the control part 256.

The control part 256 instructs the preview image generating part 262 to generate preview images of Print Data #2.

The preview image generating part 262 obtains Print Data #2 from the storage part 258. The preview image generating part 262 generates preview images from the first page of obtained Print Data #2 during the predetermined period.

The bottom block in FIG. 14 depicts preview images generated by the preview image generation processes of Print Data #1 and Print Data #2.

The preview image generating part 262 starts generating preview images from Print Data #1, and generates the preview image of pages 1 through 7 of Print Data #1. Furthermore, the preview image generating part 262 starts generating preview images from Print Data #2, and generates the preview image of the first through eighth pages of Print Data #2. The first through eighth pages of Print Data #2 correspond to pages 8 through 15 of Print Data #1.

That is, as a result of the preview image generating part 262 generating preview images with respect to Print Data #1 and Print Data #2, the preview images of pages 1 through 15 of Print Data #1 are generated.

The control part 256 notifies the storage part 258 that Print Data #2 are the data of page 8 and the subsequent pages of Print Data #1.

The storage part 258 correlates and stores the preview images generated from Print Data #1 and the preview images generated from Print Data #2. Specifically, the storage part 258 stores the information that the preview images generated from Print Data #2 are preview images that follow the preview images generated from Print Data #1. If the preview images of pages further ahead are requested, Print Data #2 are updated to exclude pages up to page 15 of Print Data #1, and preview image generation is performed in the same manner. Print Data #3 may be newly generated. Generating new data, however, takes up an extra memory area. Accordingly, it is more efficient to update Print Data #2. Instead of updating Print Data #2 by excluding the print data of pages whose preview images have been generated up to the previous time, Print Data #2 excluding pages preceding requested pages may be generated.

The control part 256 may execute the second preview image generation process of print data (Print Data #2) subsequently to the first preview image generation process, in response to reception of a job. Alternatively, the control part 256 may generate the second preview image generation process in response to reception of a request for preview images ("preview image request") from the image forming apparatus 300.

Next, a functional arrangement of the server 200 according to the second embodiment is described with reference to FIG. 2.

The server 200 includes the transmission and reception part 252 that receives print data from the client 100, the control part 256 that determines generation of preview images from first print data, and the preview image generating part 262 that generates preview images of the first print data in response to reception of an instruction from the control part 256. The transmission and reception part 252 transmits the generated preview images to the image forming apparatus 300. The print data are included in a job.

The preview image generating part 262 generates the preview images of pages of the first print data within a predetermined period from the start of generation of the preview image of the first page.

The predetermined period is set to a value such as 10 seconds, 20 seconds, or 30 seconds by a manager of the server 200. The server 200 may set the predetermined period to a predetermined value in accordance with the amount of generation of preview images, namely, "Large," "Normal," or "Small," set by the manager of the server 200. For example, when "Large" is set, the server 200 may set the predetermined period to a relatively long time (for example, 30 seconds). For example, when "Normal" is set, the server 200 may set the predetermined period to a normal value (for example, 20 seconds). For example, when "Small" is set, the server 200 may set the predetermined period to a relatively short time (for example, 10 seconds).

When the preview images of all pages are not generated, the preview image generating part 262 transmit an instruction to generate second print data to the control part 256.

In response to reception of the instruction, the control part 256 generates the second print data from the first print data. Specifically, the second print data are the first print data from which pages whose preview images are generated during the predetermined period are excluded, and are used to generate the preview images of pages whose preview images are not generated during the predetermined period.

For example, it is assumed that the first print data contain the data of N pages and the preview images of pages 1 through M (M<N, M and N are natural numbers) are generated. In this case, the second print data contain the data of pages M+1 through N of the first print data.

In generating the second print data from the first print data, the control part 256 may copy a portion of the first print data necessary to generate the second print data. Alternatively, the control part 256 may copy the first print data and thereafter delete a portion of the copied first print data that is unnecessary to generate the second print data.

The control part 256 instructs the preview image generating part 262 to generate preview images from the second print data.

The preview image generating part 262 generates preview images of the second print data from the first page of the second print data during the predetermined period.

When there remain pages whose preview images are not generated, the generation of the second print data by the control part 256 and the generation of preview images from the generated second print data by the preview image generating part 262 may be repeatedly executed.

The server 200 includes the storage part 258 that stores the generated preview images. The control part 256 notifies the storage part 258 that the second print data are the first print data from which pages whose preview images are generated are excluded. In response to the notification, the storage part 258 determines the preview images generated from the second print data as preview images following the preview images generated from the first print data.

Thus, the server 200 can guarantee the order of preview images generated from different print data.

Information stored in the storage part 258 is described with reference to FIG. 15. FIG. 15 is a diagram depicting information stored in the storage part 258 according to the second embodiment.

The job table storage part 258a of the storage part 258 stores the table depicted in FIG. 15.

In the table, a print job ID, a user ID, a print data path, and a preview image data path are stored in correlation with one another.

The print data path is a path indicating the storage location of print data in the print data storage part 258b, and is set job by job. The preview image data path is a path indicating the storage location of preview images in the preview image data storage part 258c, and is set job by job.

The preview images generated from the first print data and the preview images generated from the second print data are stored in a location indicated by the same path in the preview image data storage part 258c. The preview images generated from the second print data become preview images subsequent to the preview images generated from the first print data.

If the preview images of all the pages of the first print data are not generated, the preview image generating part 262 may generate preview images from the second print data. When the server 200 operates to generate the preview images of all the pages, a high operational load is imposed on the server 200, while a response to a preview image request from the image forming apparatus 300 is quick.

When the number of generated preview images is less than or equal to a predetermined value, the preview image generating part 262 may generate preview images from the second print data. In this case, an operational load on the server 200 increases because the server 200 generates a larger number of preview images than the predetermined value. It is possible, however, to decrease the number of cases where the server 200 newly generates preview images in response to a request to display preview images. The predetermined value may be set to a value such as 5, 10, or 20.

The preview image generating part 262 may generate preview images from the first print data in response to reception of a job, and determine whether to generate preview images from the second print data in response to completion of the generation of preview images from the first print data. The preview image generating part 262 generates preview images from the first print data and the second print data in response to reception of a job. Accordingly, the server 200 is more likely to be able to respond to a preview image request from the image forming apparatus 300 in a short period of time.

The transmission and reception part 252 receives a preview image request from the image forming apparatus 300. The request includes information on pages whose preview images are requested to be displayed among the pages of the first print data. The information includes information that specifies the pages. When the preview images of the specified pages are not generated, the preview image generating part 262 generates preview images from the first print data or the second print data. The server 200 repeatedly executes the process of causing the control part 256 to generate the second print data and causing the preview image generating part 262 to generate preview images, until the preview images of the specified pages are generated. By thus operating, the server 200 can ensure transmission of the preview images requested by the image forming apparatus 300.

It is assumed that the above-described embodiment is executed when the server 200 receives a job generated in the second print language.

When the first print language is used for a job, the preview image generating part 262 generates the preview images of a predetermined range of pages of the first print data as described in the first embodiment.

When the second print language is used for a job, the preview image generating part 262 generates preview images of the first print data from the first page of the first print data for a predetermined period as described above. When the preview images of all pages are not generated as a result of the generation of preview images, the preview image generating part 262 generates preview images from the second print data that are different from the first print data in that pages of the first print data of which the preview images are generated are excluded.

Next, an operation sequence according to the second embodiment is described with reference to FIGS. 16 through 18.

Figure 16:
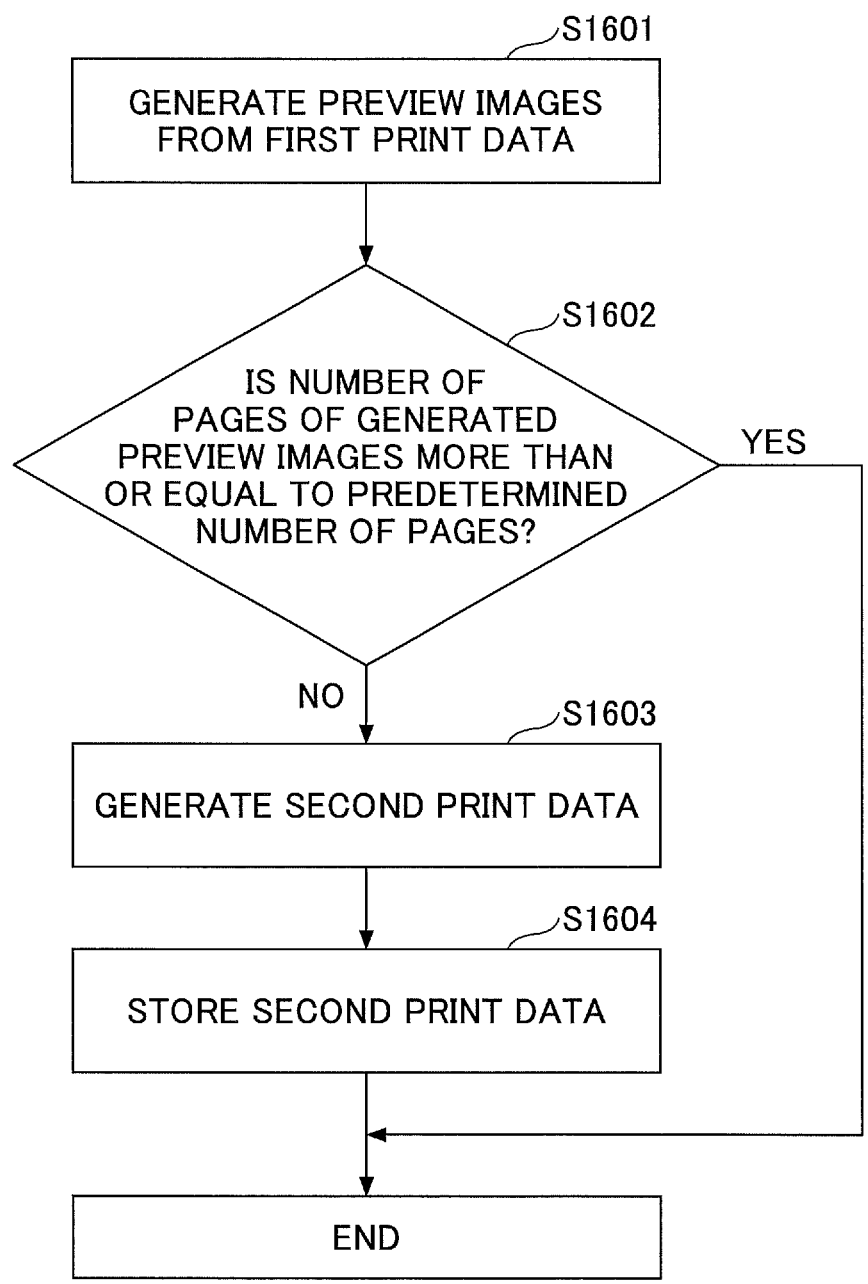
FIG. 16 is a flowchart of operations according to the second embodiment.

FIG. 16 is a flowchart of operations according to the second embodiment.

FIG. 16 illustrates a process where the server 200 generates preview images in response to reception of a job containing the first print data from the client 100 and thereafter generates the second print data. Here, it is assumed that the second print language is used for the first print data.

At step S1601, the preview image generating part 262 generates preview images from the first print data. The preview image generating part 262 transmits the generated preview images to the preview image data storage part 258c. The preview image data storage part 258c stores the received preview images.

At step S1602, the control part 256 determines whether the number of pages of the generated preview images is less than a predetermined number of pages.

If the number of pages of the generated preview images is more than or equal to the predetermined number of pages (YES at step S1602), the process ends. If the number of pages of the generated preview images is less than the predetermined number of pages (NO at step S1602), the process proceeds to step S1603.

At step S1603, the control part 256 generates the second print data.

At step S1604, the control part 256 instructs the print data storage part 258b to store the generated second print data. In response to reception of the instruction, the print data storage part 258b stores the generated second print data.

According to the above-described operation sequence, the second print data are generated after preview images are generated from the first print data. Therefore, it is possible to generate preview images in a shorter period of time to make a user waiting time shorter than in the case of generating the second print data in response to reception of a preview image request from the image forming apparatus 300.

The server 200 may generate preview images in response to reception of a preview image request from the image forming apparatus 300 and generate the second print data after completion of the generation of preview images. In this case, the same process as in the above-described operation sequence is executed.

Figure 17:
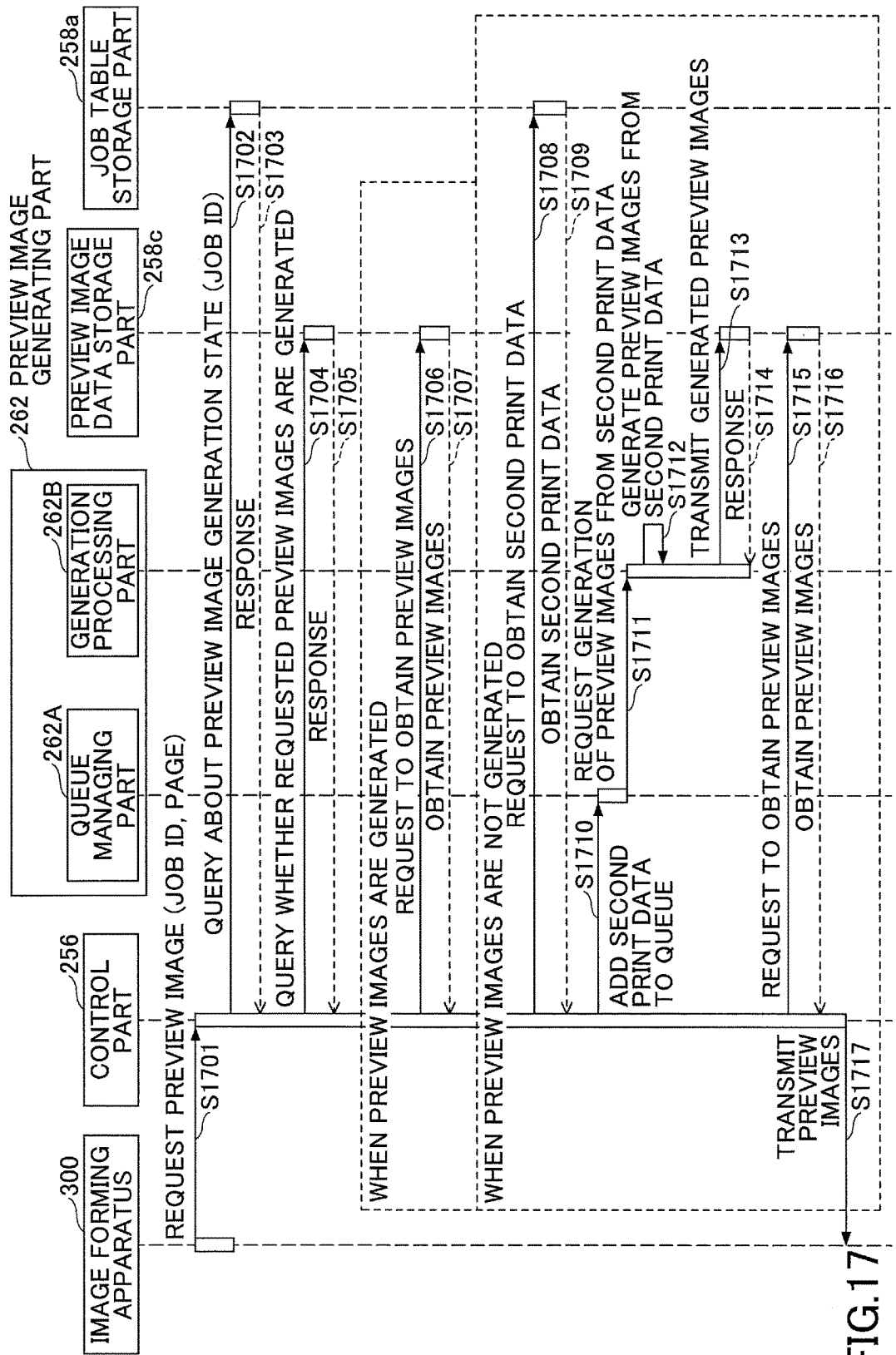
FIG. 17 is a diagram depicting an operation sequence according to the second embodiment.

FIG. 17 is a diagram depicting an operation sequence according to the second embodiment.

Here, it is assumed that the preview images of some pages are generated in response to reception of a job containing the first print data generated in the second print language from the client 100 and the second data, which are the first print data from which pages whose preview images are generated are excluded, are thereafter generated.

At step S1701, the control part 256 receives a preview image request from the image forming apparatus 300 via the transmission and reception part 252. The request includes a job ID corresponding to the first print data and page numbers of print data with respect to which preview images are requested.

At step S1702, the control part 256 queries the job table storage part 258a whether preview images are generated. The query uses the job ID.

At step S1703, the control part 256 receives a response from the job table storage part 258a. The response includes information indicating that preview images are generated.

At step S1704, the control part 256 queries the preview image data storage part 258c whether the requested preview images are generated. The query includes the job ID and the page numbers of the requested preview images.

At step S1705, the preview image data storage part 258c transmits a response to the control part 256. The response includes information as to whether the queried preview images are generated.

Steps S1706 and S1707 are executed when the preview images requested by the image forming apparatus 300 are already generated.

At step S1706, the control part 256 transmits a request to obtain preview images to the preview image data storage part 258c. The request includes the page numbers of the preview images requested to be obtained.

At step S1707, the control part 256 obtains the requested preview images from the preview image data storage part 258c.

If the preview images requested by the image forming apparatus 300 are not generated, the process of steps S1708 through S1716 is executed.

At step S1708, the control part 256 transmits a request to obtain the second print data to the job table storage part 258a.

At step S1709, the control part 256 obtains the second print data from the job table storage part 258a.

At step S1710, the control part 256 adds the second print data to the queue managing part 262A. The queue managing part 262A registers the second print data with a queue.

At step S1711, the queue managing part 262A requests the generation processing part 262B to generate preview images of the second print data. The preview image generating part 262 controls the order of starting a preview image generation process in view of, for example, the attributes of the second print data.

At step S1712, the generation processing part 262B generates preview images from the second print data.

At step S1713, the generation processing part 262B transmits the generated preview images to the preview image data storage part 258c. The preview image data storage part 258c stores the received preview images in correlation with the preview images generated from the first print data. Specifically, the preview image data storage part 258c determines the preview images generated from the second print data as preview images following the preview images generated from the first print data.

At step S1714, the generation processing part 262B receives a response to the effect that the preview images are stored from the preview image data storage part 258c.

At step S1715, the control part 256 transmits a request to obtain preview images to the preview image data storage part 258c. The request includes the page numbers of the preview images requested to be obtained.

At step S1716, the control part 256 obtains the requested preview images from the preview image data storage part 258c.

If the requested preview images cannot be obtained, the process of steps S1708 through S1716 is repeated.

At step S1717, the control part 256 transmits the requested preview images to the image forming apparatus 300 via the transmission and reception part 252.

Figure 18:
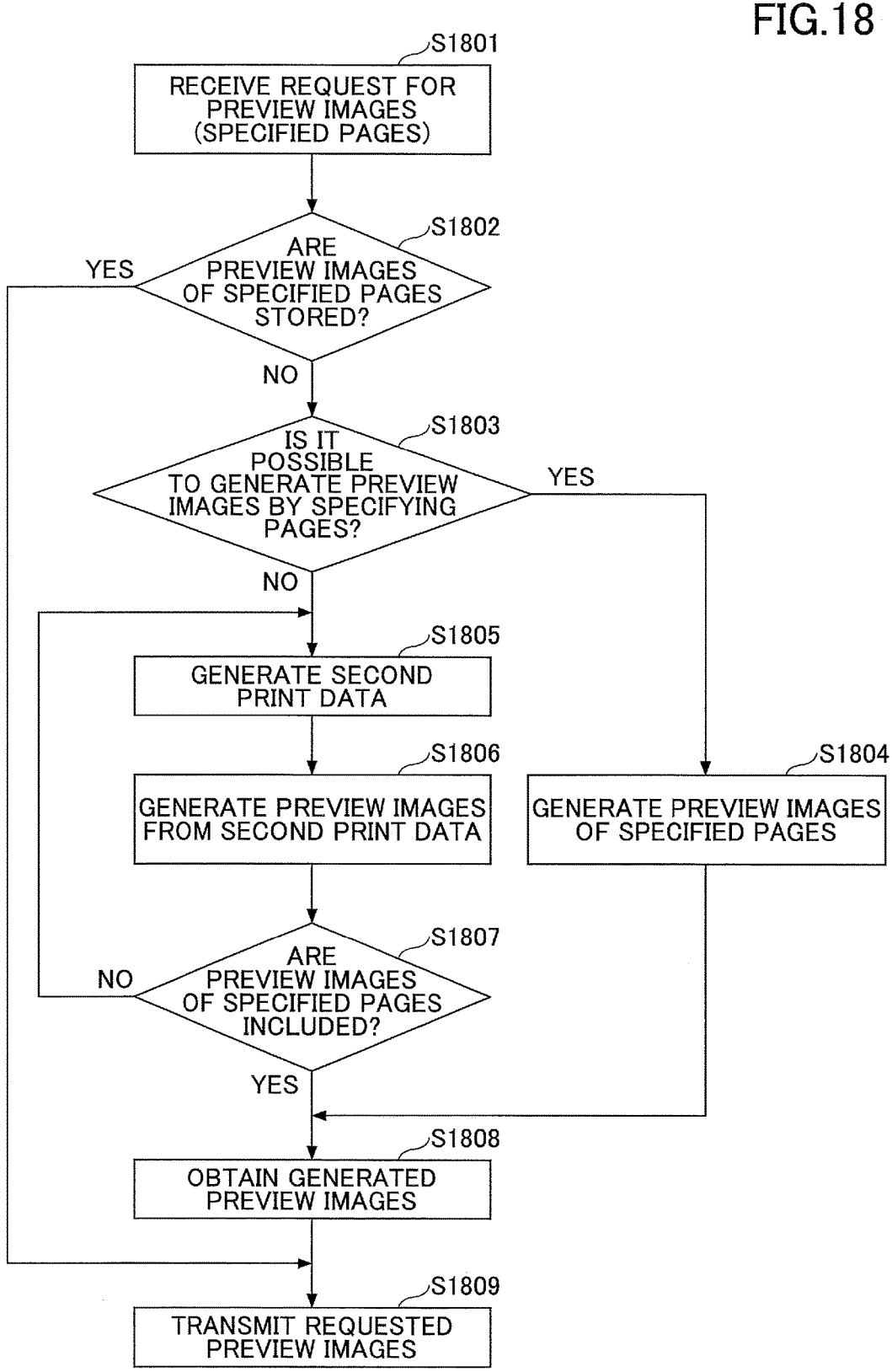
FIG. 18 is a flowchart of operations according to the second embodiment.

FIG. 18 is a flowchart of operations according to the second embodiment. FIG. 18 illustrates operations that the server 200 performs when receiving a preview image request from the image forming apparatus 300. In the operation sequence of FIG. 18, it is assumed that when receiving a preview image request from the image forming apparatus 300, the server 200 has generated and stored preview images from the first print data but has not generated the second print data.

At step S1801, the transmission and reception part 252 of the server 200 receives a preview image request from the image forming apparatus 300. The request includes a job ID corresponding to the first print data and the page numbers of print data with respect to which preview images are requested.

At step S1802, the control part 256 determines whether the preview images of the specified pages are stored in the preview image data storage part 258c. When the server 200 receives a preview image request during generation of preview images, the control part 256 may perform the determination after completion of the generation of preview images.

If the preview images of the specified pages are stored in the preview image data storage part 258c (YES at step S1802), the process proceeds to step S1809. If the preview images of the specified pages are not stored in the preview image data storage part 258c (NO at step S1802), the process proceeds to step S1803.

At step S1803, the control part 256 determines whether the preview images of the specified pages can be generated. Specifically, the control part 256 determines whether the job is generated in the first print language, which allows the preview images of the specified pages to be directly generated, or the second print language, which prevents the preview images of the specified pages from being directly generated.

If it is possible to directly generate the preview images of the specified pages (YES at step S1803), the process proceeds to step S1804. If it is impossible to directly generate the preview images of the specified pages (NO at step S1803), the process proceeds to step S1805.

At step S1804, the preview image generating part 262 generates the preview images of the specified pages of the first print data, and stores the generated preview images in the preview image data storage part 258c.

At step S1805, the control part 256 generates the second print data. The control part 256 refers to the preview image data storage part 258c to identify the pages of the preview images that are already generated. The control part 256 generates the second print data by excluding the print data of the identified pages. The control part 256 transmits the generated second print data to the job table storage part 258a. The job table storage part 258a stores the received second print data.

At step S1806, the preview image generating part 262 generates preview images from the second print data generated by the control part 256 for a predetermined period. The control part 256 transmits an instruction to generate preview images from the second print data to the preview image generating part 262. The preview image generating part 262 generates preview images from the second print data for the predetermined period.

The preview image generating part 262 transmits information on the correspondence between the second print data and the first print data and the preview images generated from the second print data to the preview image data storage part 258c. The preview image data storage part 258c stores the received preview images generated from the second print data in correlation with the preview images generated from the first print data. Specifically, the storage part 258 determines the preview images generated from the second print data as preview images following the preview images generated from the first print data.

At step S1807, the control part 256 refers to the preview image data storage part 258c to determine whether the preview images generated from the second print data include the preview images of the specified pages.

If the preview images of the specified pages are included (YES at step S1807), the process proceeds to step S1808. If the preview images of the specified pages are not included (NO at step S1807), the process returns to step S1805, and the preview image generating part 262 again generates preview images from the second print data again generated by the control part 256.

At step S1808, the transmission and reception part 252 obtains the preview images of the specified pages from the preview image data storage part 258c.

At step S1809, the transmission and reception part 252 transmits the preview images of the specified pages to the image forming apparatus 300. The operation receiving part 356 of the image forming apparatus 300 displays the preview images obtained from the server 200.

The transmission and reception part 252 executes the process of steps S1808 and S1809 based on the instruction of the control part 256.

While the server 200 generates preview images according to the above-described embodiment, the image forming apparatus 300 may alternatively generate preview images. For example, by implementing the same functions as those of, for example, the preview image generating part 262 in the image forming apparatus 300, it is possible to generate preview images in the image forming apparatus 300.

The server 200 is an example of an information processing apparatus. The transmission and reception part 252 is an example of a first receiver, a second receiver, and a transmitter.

The server 200 may be provided with a storage medium in which a program code of software that implements the functions of the above-described embodiments is recorded. Then, the server 200 reads and executes the program code stored in the storage medium to carry out the above-described embodiments. In this case, the program code read from the storage medium implements the functions of the above-described embodiments, and the storage medium storing the program code forms the individual embodiments. Here, the storage medium is a recording medium or a non-transitory storage (recording) medium.

Furthermore, not only are the functions of the above-described embodiments implemented by a computer executing the read program code, but also an operating system (OS) running on the computer may executes part or the entirety of actual processing in accordance with the instruction of the program code. Furthermore, the functions of the above-described embodiments may be implemented by the processing.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

Various aspects of the subject-matter described herein may be set out non-exhaustively in the following numbered clause:

1. An information processing apparatus including:
a memory; and
a processor coupled to the memory, and configured to
receive first print data from a client apparatus;
generate at least one first preview image of the first print data; and
transmit the generated at least one first preview image to an image forming apparatus,
wherein the processor is configured to generate the at least one first preview image of a predetermined range of pages of the first print data in response to a determination that a first print language is used for the first print data, and
wherein the processor is configured to generate the at least one first preview image of the first print data for a predetermined period from a start of generation of the at least one first preview image of an initial page of the first print data, and to generate second print data for generating at least one second preview image that is not generated from the first print data during the predetermined period, in response to a determination that a second print language is used for the first print data, the second print data being the first print data from which a page of which the at least one first preview image is generated during the predetermined period is excluded.

What is claimed is:
1. An information processing apparatus, comprising:
a memory; and
a processor coupled to the memory, and configured to
receive first print data from a client apparatus;
determine whether a print language used in the received first print data allows the processor to generate a preview image for the first print data by specifying a page range of the first print data;
generate at least one first preview image from the first print data for a predetermined period from a start of generation of the at least one first preview image of an initial page of the first print data, in response to determining that the print language used in the received first print data does not allow the processor to generate the preview image for the first print data by specifying the page range of the first print data;
transmit the generated at least one first preview image to an image forming apparatus; and
generate second print data for generating at least one second preview image that is not generated from the first print data during the predetermined period, the second print data being the first print data from which a page of which the at least one first preview image is generated during the predetermined period is excluded.

2. The information processing apparatus as claimed in claim 1, wherein the processor is further configured to store the at least one second preview image generated from the second print data as a preview image following the at least one first preview image generated from the first print data.

3. The information processing apparatus as claimed in claim 1, wherein the processor is further configured to generate the at least one second preview image from the second print data in response to a determination that a number of pages of the generated at least one first preview image is less than or equal to a predetermined value.

4. The information processing apparatus as claimed in claim 1, wherein the processor is configured to further determine whether to generate the at least one second preview image from the second print data in response to completion of generating the at least one first preview image.

5. The information processing apparatus as claimed in claim 1, wherein the processor is further configured to
receive a request to display a preview image of a specified page of the first print data from the image forming apparatus; and
generate the at least one second preview image from the second print data in response to a determination that the preview image of the specified page is not included in the generated at least one first preview image.

6. An information processing system comprising:
an information processing apparatus; and
an image forming apparatus,
wherein the information processing apparatus includes
a first memory; and
a first processor coupled to the first memory, and configured to
receive first print data from a client apparatus;
determine whether a print language used in the received first print data allows the first processor to generate a preview image for the first print data by specifying a page range of the first print data;
generate at least one first preview image of the first print data for a predetermined period from a start of generation of the at least one first preview image of an initial page of the first print data, in response to determining that the print language used in the received first print data does not allow the first processor to generate the preview image for the first print data by specifying the page range of the first print data; and
transmit the generated at least one first preview image to the image forming apparatus,
wherein the image forming apparatus includes
a second memory; and
a second processor coupled to the second memory, and configured to
display the at least one first preview image in response to an instruction from a user; and
transmit a signal to the information processing apparatus, the signal requesting transmission of a preview image of a page of the first print data specified by the user, and
wherein the first processor is configured to, in response to reception of the signal,
transmit the preview image of the specified page in response to a determination that the preview image of the specified page is included in the generated at least one first preview image; and
generate second print data for generating at least one second preview image that is not generated from the first print data during the predetermined period, in response to a determination that the preview image of the specified page is not included in the generated at least one first preview image, the second print data being the first print data from which a page of which the at least one first preview image is generated during the predetermined period is excluded.

7. The information processing system as claimed in claim 6, wherein the first processor is further configured to store the at least one second preview image generated from the second print data as a preview image following the at least one first preview image generated from the first print data.

8. The information processing system as claimed in claim 6, wherein the first processor is further configured to generate the at least one second preview image from the second print data in response to a determination that a number of pages of the generated at least one first preview image is less than or equal to a predetermined value.

9. The information processing system as claimed in claim 6, wherein the first processor is configured to
further determine whether to generate the at least one second preview image from the second print data in response to completion of generating the at least one first preview image.

10. The information processing system as claimed in claim 6, wherein the first processor is further configured to
receive the signal from the image forming apparatus; and
generate the at least one second preview image from the second print data in response to the determination that the preview image of the specified page is not included in the generated at least one first preview image.

11. A control method executed between an information processing apparatus and an image forming apparatus, the control method comprising:
the information processing apparatus executing a process that includes
receiving first print data from a client apparatus;
determining whether a print language used in the received first print data allows the information processing apparatus to generate a preview image for the first print data by specifying a page range of the first print data;
generating at least one first preview image of the first print data for a predetermined period from a start of generation of the at least one first preview image of an initial page of the first print data, in response to determining that the print language used in the received first print data does not allow the information processing apparatus to generate the preview image for the first print data by specifying the page range of the first print data; and
transmitting the generated at least one first preview image to the image forming apparatus;
the image forming apparatus executing a process that includes
displaying the at least one first preview image in response to an instruction from a user; and
transmitting a signal to the information processing apparatus, the signal requesting transmission of a preview image of a page of the first print data specified by the user; and
the information processing apparatus executing, in response to reception of the signal, a process that includes
transmitting the preview image of the specified page in response to a determination that the preview image of the specified page is included in the generated at least one first preview image; and
generating second print data for generating at least one second preview image that is not generated from the first print data during the predetermined period, in response to a determination that the preview image of the specified page is not included in the generated at least one first preview image, the second print data being the first print data from which a page of which the at least one first preview image is generated during the predetermined period is excluded.

12. The control method as claimed in claim 11, further comprising:

the information processing apparatus executing a process that includes storing the at least one second preview image generated from the second print data as a preview image following the at least one first preview image generated from the first print data.

13. The control method as claimed in claim 11, further comprising:

the information processing apparatus executing a process that includes generating the at least one second preview image from the second print data in response to a determination that a number of pages of the generated at least one first preview image is less than or equal to a predetermined value.

14. The control method as claimed in claim 11, wherein the information processing apparatus further executes a process that includes determining whether to generate the at least one second preview image from the second print data in response to completion of generating the at least one first preview image.

15. The control method as claimed in claim 11, further comprising:

the information processing apparatus executes a process that includes receiving the signal from the image forming apparatus; and generating the at least one second preview image from the second print data in response to the determination that the preview image of the specified page is not included in the generated at least one first preview image.

16. The information processing apparatus as claimed in claim 1, wherein the predetermined period is preset in a timer.

* * * * *